US012643799B2

(12) United States Patent
Aoki

(10) Patent No.: US 12,643,799 B2
(45) Date of Patent: Jun. 2, 2026

(54) HYDROGEN PERMEABLE MATERIAL

(71) Applicant: NATIONAL UNIVERSITY CORPORATION HOKKAIDO UNIVERSITY, Hokkaido (JP)

(72) Inventor: Yoshitaka Aoki, Hokkaido (JP)

(73) Assignee: National University Corporation Hokkaido University, Hokkaido (JP)

( * ) Notice: Subject to any disclaimer, the term of this patent is extended or adjusted under 35 U.S.C. 154(b) by 888 days.

(21) Appl. No.: 17/997,392

(22) PCT Filed: Mar. 7, 2022

(86) PCT No.: PCT/JP2022/009651
§ 371 (c)(1),
(2) Date: Oct. 28, 2022

(87) PCT Pub. No.: WO2022/191111
PCT Pub. Date: Sep. 15, 2022

(65) Prior Publication Data
US 2023/0227324 A1    Jul. 20, 2023

(30) Foreign Application Priority Data

Mar. 12, 2021    (JP) ................................. 2021-039946

(51) Int. Cl.
*C01G 25/02*    (2006.01)
*B01D 71/02*    (2006.01)
(Continued)

(52) U.S. Cl.
CPC ............. *C01G 25/02* (2013.01); *B01D 71/02* (2013.01); *C01G 25/006* (2013.01); *C04B 35/01* (2013.01);
(Continued)

(58) Field of Classification Search
None
See application file for complete search history.

(56) References Cited

U.S. PATENT DOCUMENTS

| 6,235,417 B1 | 5/2001 | Wachsman et al. | |
| 2002/0170429 A1* | 11/2002 | Flippo .................. | B01D 53/229 |
| | | | 96/108 |

FOREIGN PATENT DOCUMENTS

| JP | 2007-035560 | 2/2007 |
| JP | 2007-141669 | 6/2007 |

(Continued)

OTHER PUBLICATIONS

Toriumi et al, Barium Indate-Zirconate Perovskite Oxyhydride with Enhanced Hydride Ion/Electron Mixed Conductivity, Aug. 15, 2022, Chem. Mater. 2022, 34, 7389-7401 (Year: 2022).*

(Continued)

*Primary Examiner* — Mary Grace Byram
(74) *Attorney, Agent, or Firm* — HSML P.C.

(57) ABSTRACT

An object of the present invention is to provide a hydrogen permeable material having excellent hydrogen permeability. Another object of the present invention is to provide a composite member and a fuel cell including the hydrogen permeable material. The hydrogen permeable material comprises a perovskite type compound represented by the following general formula (1a). In another embodiment, the hydrogen permeable material comprises a hydrogen-containing perovskite type compound, which is the perovskite type compound represented by the general formula (1a) with introduced hydride ion (H⁻). Wherein M is at least one alkaline earth metal selected from the group consisting of Ba, Sr and Ca, x is a numerical value of 0 or more and 0.3 or less, y is a numerical value of more than 0 and 0.75 or less, w is a value at which an average valence of In is +1.0 or more and +2.5 or less, and y≥w.

(Continued)

$M_{1-x}Zr_{1-y}In_yO_{3-x-0.5y-w}$      (1a)

20 Claims, 13 Drawing Sheets

(51) Int. Cl.

| | |
|---|---|
| *C01G 25/00* | (2006.01) |
| *C04B 35/01* | (2006.01) |
| *C04B 35/488* | (2006.01) |
| *H01M 4/86* | (2006.01) |
| *H01M 8/12* | (2016.01) |
| *H01M 8/1253* | (2016.01) |
| *H01M 8/126* | (2016.01) |

(52) U.S. Cl.

CPC ............ *C04B 35/488* (2013.01); *H01M 4/86* (2013.01); *H01M 8/12* (2013.01); *H01M 8/1253* (2013.01); *H01M 8/126* (2013.01); *C01P 2006/40* (2013.01); *H01M 2008/1293* (2013.01)

(56) References Cited

FOREIGN PATENT DOCUMENTS

| | | |
|---|---|---|
| JP | 2015-147992 | 8/2015 |
| JP | 2015-147993 | 8/2015 |
| JP | 2017-188440 | 10/2017 |
| KR | 10-2017-0099195 | 8/2017 |
| WO | 2015/114684 | 8/2015 |

OTHER PUBLICATIONS

Takahashi et al, Mechanistic Insights into Hydride Incorporation in BaZr1-xlnxO3-δBased Perovskite Oxyhydrides, Sep. 25, 2025, Chem. Mater. 2025, 37, 7834-7845 (Year: 2025).*

International Preliminary Report on Patentability and Written Opinion issued in International Application No. PCT/JP2022/009651, Sep. 21, 2023, 10 pages w/translation.

Al-Mufachi, et al., "Hydrogen selective membranes: A review of palladium-based dense metal membranes", Renewable and Sustainable Energy Reivews, 47 (2015) 540-551.

Xie, et al., "Hydrogen permeability of Pd-Ag membrane modules with porous stainless steel substrates", International Journal of Hydrogen Energy 36 (2011) 1014-1026.

Hlleck, G., "Diffusion and Solubility of Hydrogen in Palladium and Palladium-Silver Alloys", The Journal of Physical Chemistry, vol. 74, No. 3, Feb. 5, 1970, 503-511.

Kura, et al., "Hydrogen separation by nanocrystalline titanium nitride membranses with high hydride ion conductivity", Nature Energy, vol. 2, Oct. 2017, 786-794.

Kura, et al., "Enhanced hydrogen permeability of hafnium nitride nanocrystallnine membranes by interfacial hydride conduction", Journal of Materials Chemistry A, 2018, 6, 2730-2741.

Kochetova, et al., "Recent activity in the development of proton-conducting oxides for high-temperature applications", RSC Advances, 2016, 6, 73222-73268.

Ahmed, et al., "Proton conductivity and low temperature structure of In-doped BaZrO3", Solid State Ionics 177 (2006) 2357-2362.

Ahmed, et al., "Location of deuteron sites in the proton conducting perovskite BaZr0.50In0.50O3-y", Journal of Alloys and Compounds 450 (2008) 103-110.

Ahmed, et al., "Synthesis and structural characerization of perovskite type proton conducting BaZr1-xlnxO3-delta (0.0x0.75)", Solid State Ionics 177 (2006) 1395-1403.

Ahmed, et al., "Improved Proton Conductivity in Spark-Plasma Sintered Dense Ceramic BaZr0.5ln.05O3-delta", electrochemical and Solid State Letters, 13 (11) B130-B134 (2010).

Sun, et al., "Chemically stable and easily sintered high-temperature proton conductor BaZr0.8In0.2O3-delta for solid oxide fuel cells", Journal of Power Sources 229 (2013) 95-101.

Tsoukalou, et al., "Structural Evolution and Dynamics of an In2O3 Catalyst for CO2 Hydrogenation to Methanol: Anoperando XAS-XRD and In Situ TEM Study", Journal of the American Chemical Society, 2019, 141, 13497-13505.

Joseph, et al., "Chemical shift of MN and Cr K-edges in X-ray absorption spectroscopy with synchrotron radiation" Bull. Mater. Sci., vol. 36, No. 6, Nov. 2013, pp. 1067-1072.

Shrivastava, B.D., "X-ray absorption fine structures (XAFS) spectroscopy using synchrotron radiation", International Conference on Recent Trends in Physics (ICRTP 2012, Journal of Physics: Conference Series 365 (2012) 012002, 12 pages.

Masuda, et al., "Hydride in BaTiO2.5H0.5: A Labile Ligand in Solid State Chemistry", Journal of the American Chemical Society, 2015, 137, 15315-15321.

Oikawa, et al., "Correlation among Oxygen Vacancies, Protonic Defects, and the Acceptor Dopant in Sc-Doped BaZrO3 Studied by 45Sc Nuclear Magnetic Resonance", Chemistry of Materials, 2015, 27, 6660-6667.

Kobayashi, et al., "An oxyhydride of BaTiO3 exhibiting hydride exchange and electronic conductivity", Nature Materials, vol. 11, Jun. 2012, 507-511.

* cited by examiner

[Figure 1]
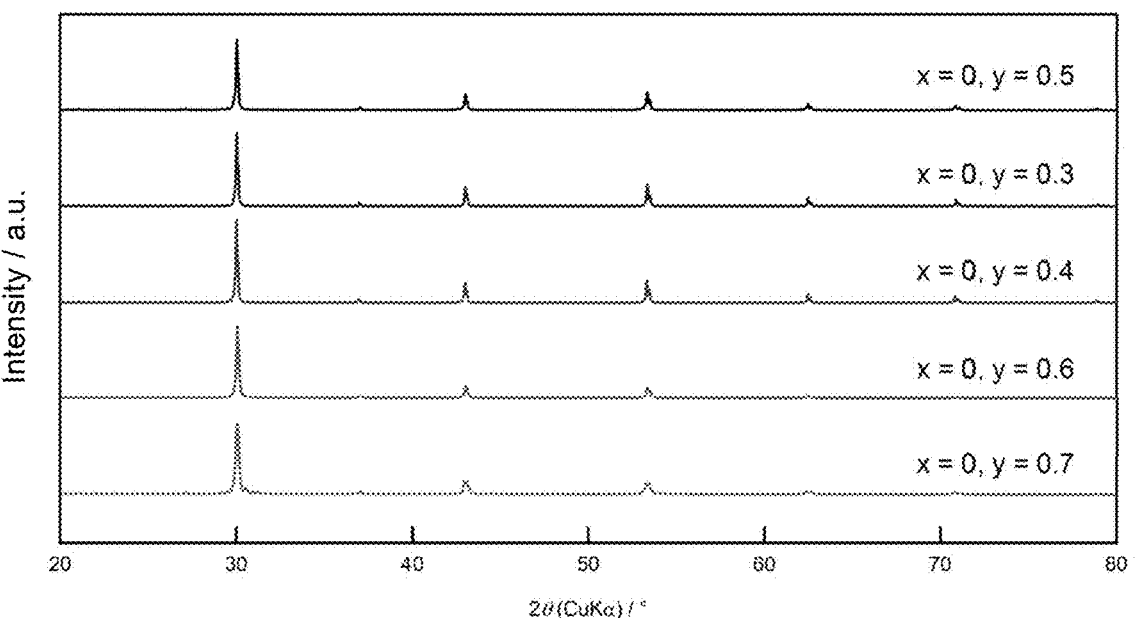
[Figure 2]
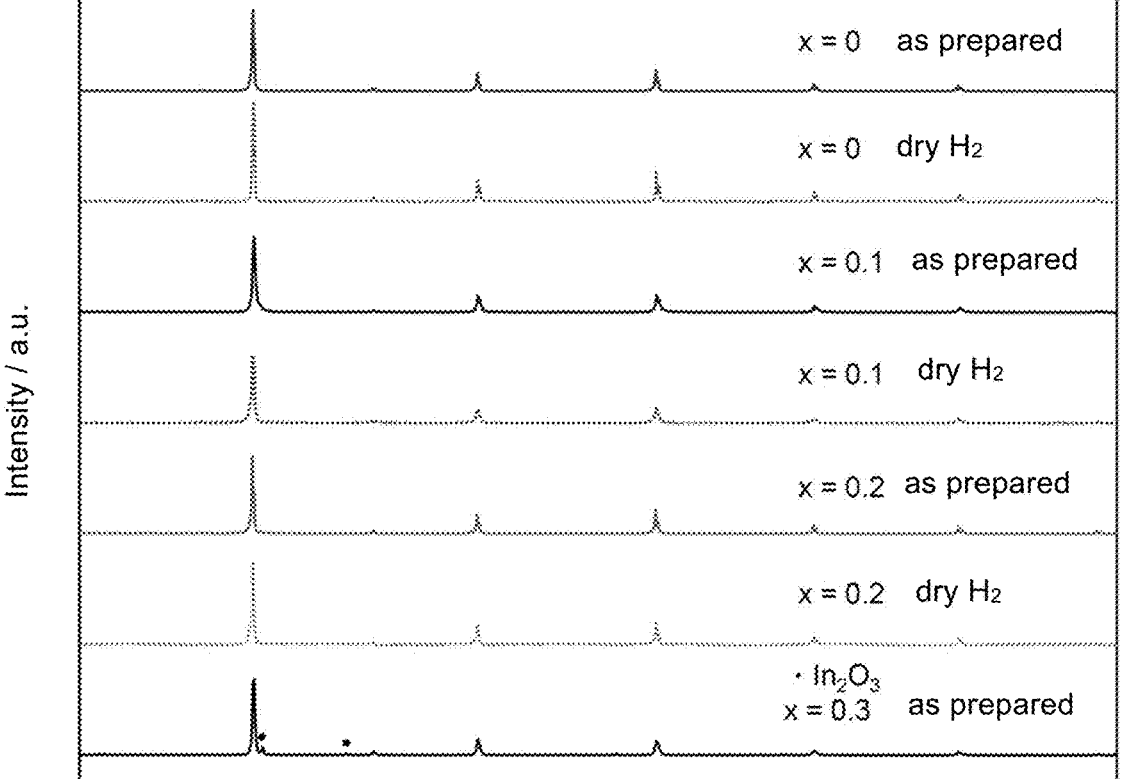

[Figure 3]
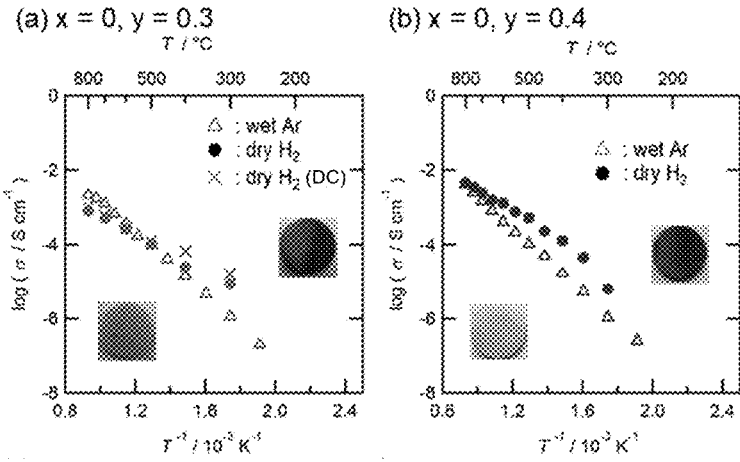
(a) x = 0, y = 0.3
(b) x = 0, y = 0.4
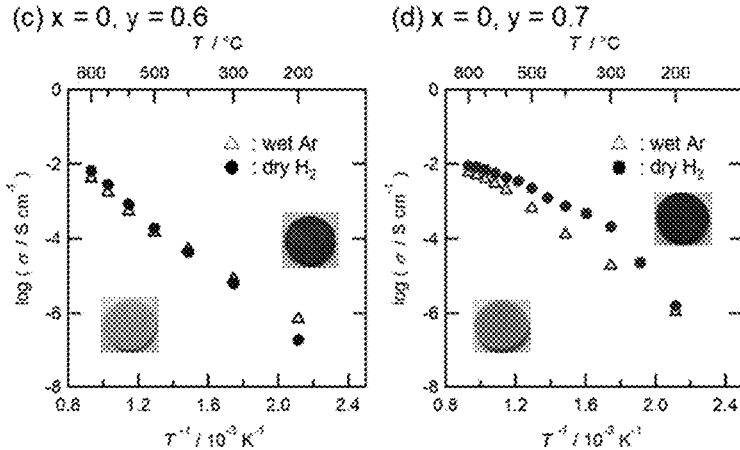
(c) x = 0, y = 0.6
(d) x = 0, y = 0.7
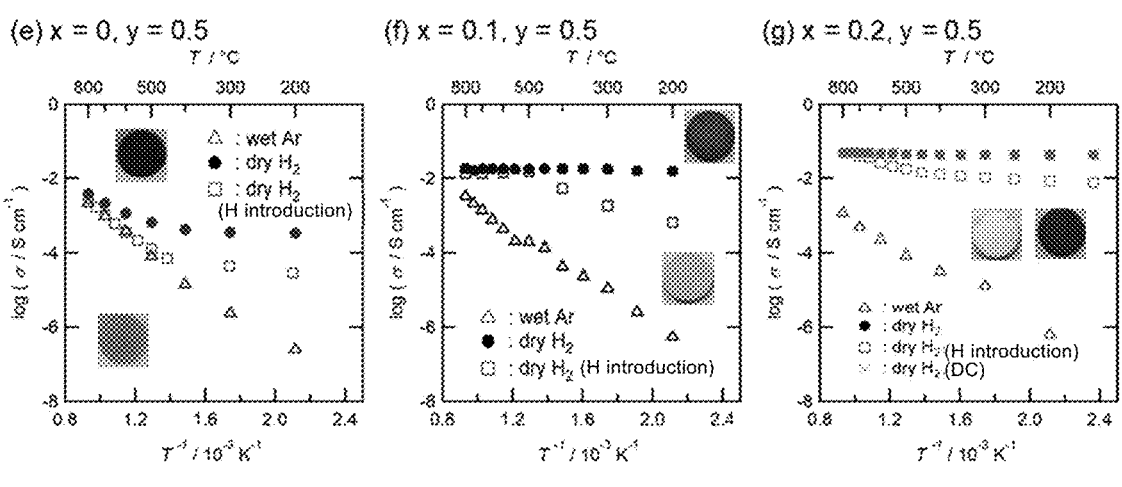
(e) x = 0, y = 0.5
(f) x = 0.1, y = 0.5
(g) x = 0.2, y = 0.5

[Figure 4]
(a) x = 0, y = 0.5
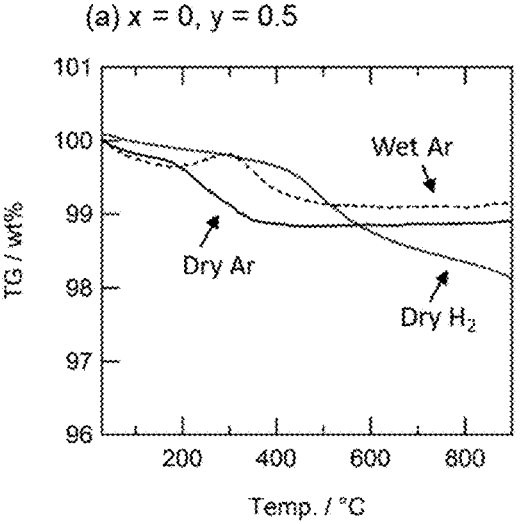
(b) x = 0.1, y = 0.5
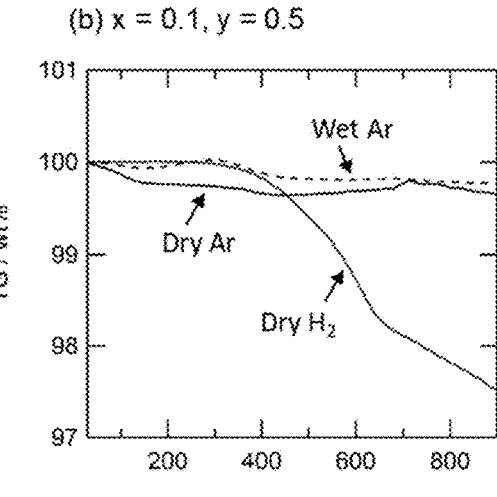
(c) x = 0.2, y = 0.5
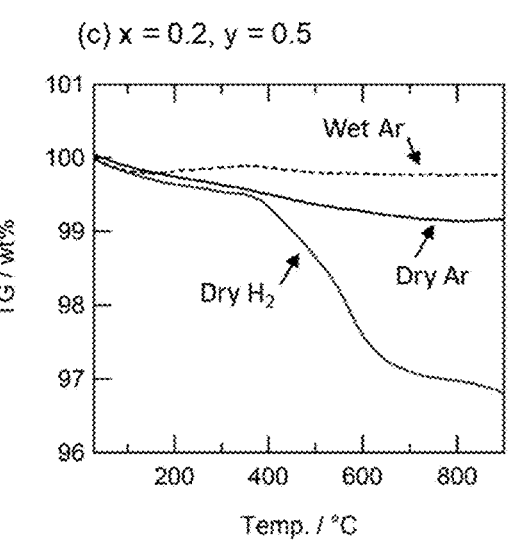
(d)
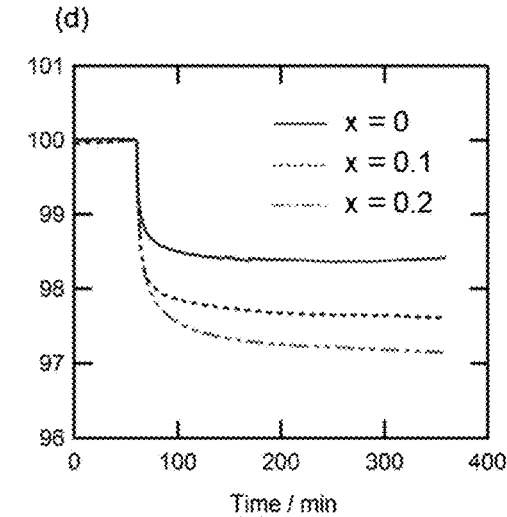
[Figure 5]
(a) x = 0, y = 0.5
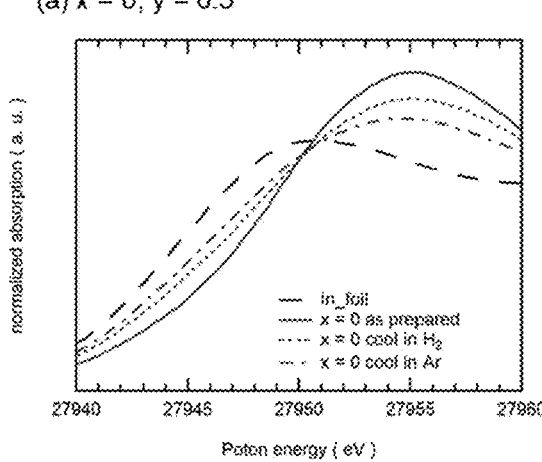
(b) x = 0.2, y = 0.5
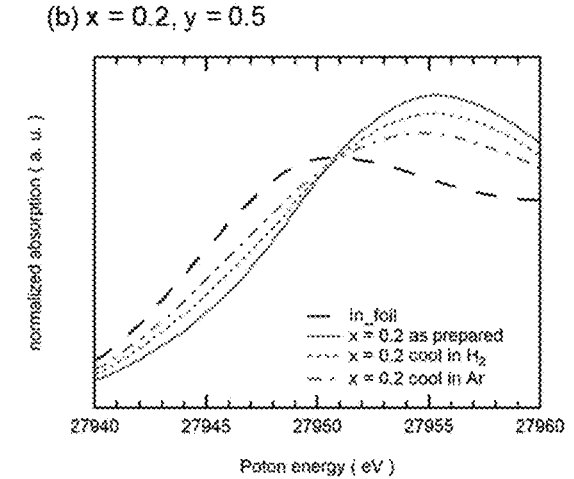

[Figure 6]
(a) x = 0, y = 0.5           (b) x = 0.2, y = 0.5
– – –  as prepared
———  after hydrogen introduction process
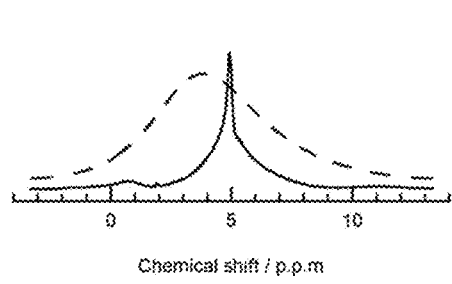
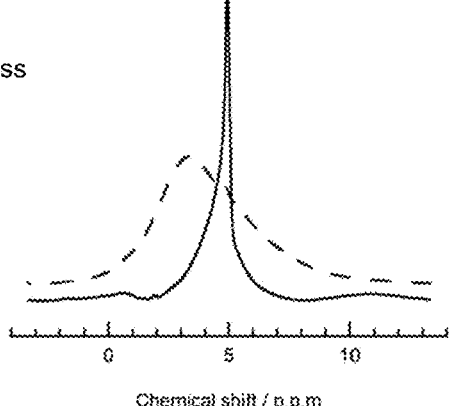
[Figure 7]
(a) x = 0, y = 0.5
Hydrogen-containing BZI compound
(b) x = 0, y = 0.5
In-reduced BZI compound
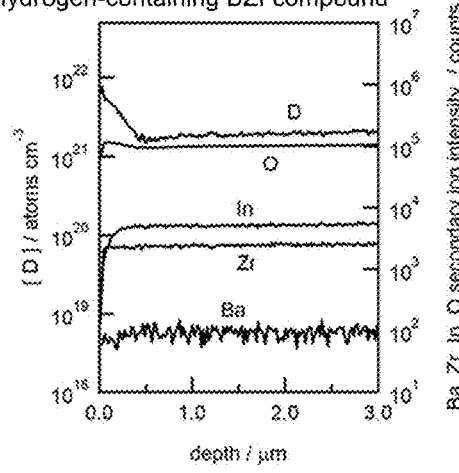
(c) x = 0.2, y = 0.5
Hydrogen-containing BZI compound
(d) x = 0.2, y = 0.5
In-reduced BZI compound
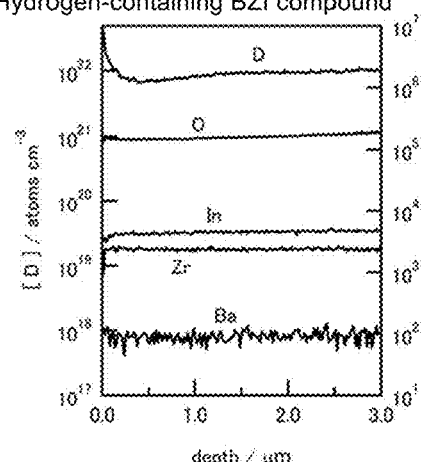

[Figure 8]
(a) x = 0, y = 0.5
In-reduced BZI compound
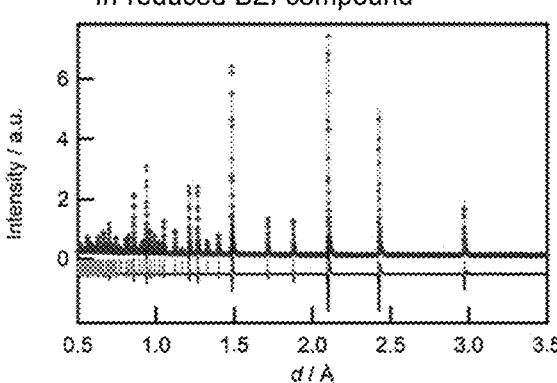
(b) x = 0, y = 0.5
Hydrogen-containing BZI compound
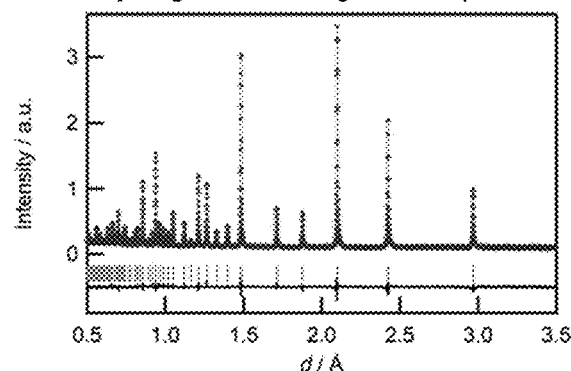
(c) x = 0.2, y = 0.5
In-reduced BZI compound
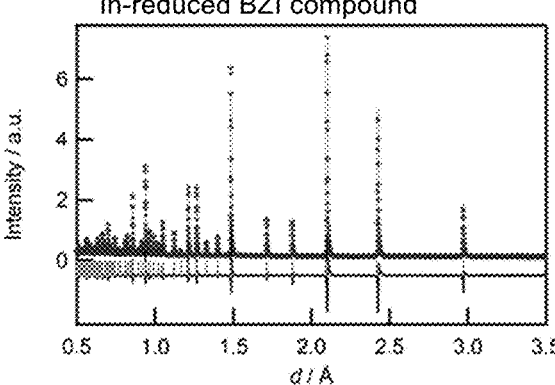
(d) x = 0.2, y = 0.5
Hydrogen-containing BZI compound
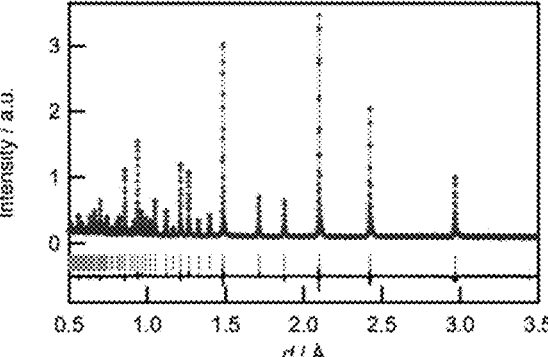

[Figure 9A]
(a)
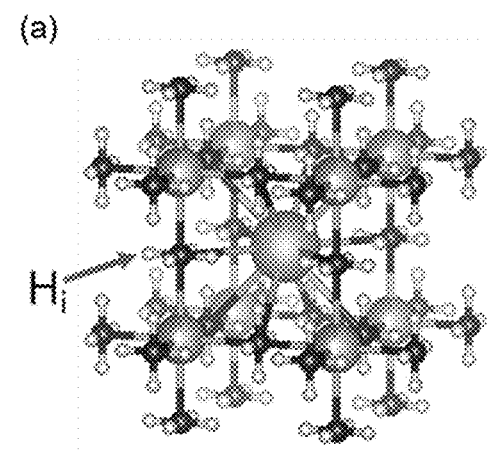
$H_i$
(b)
(c)
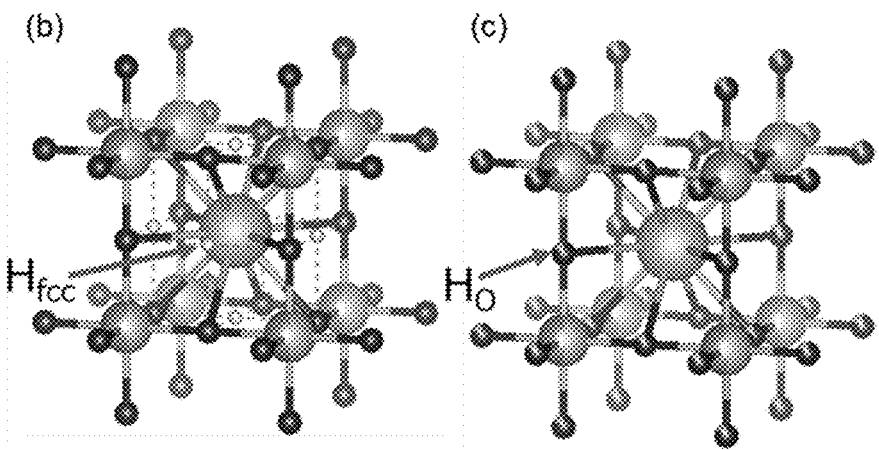
$H_{fcc}$                 $H_O$

[Figure 9B]
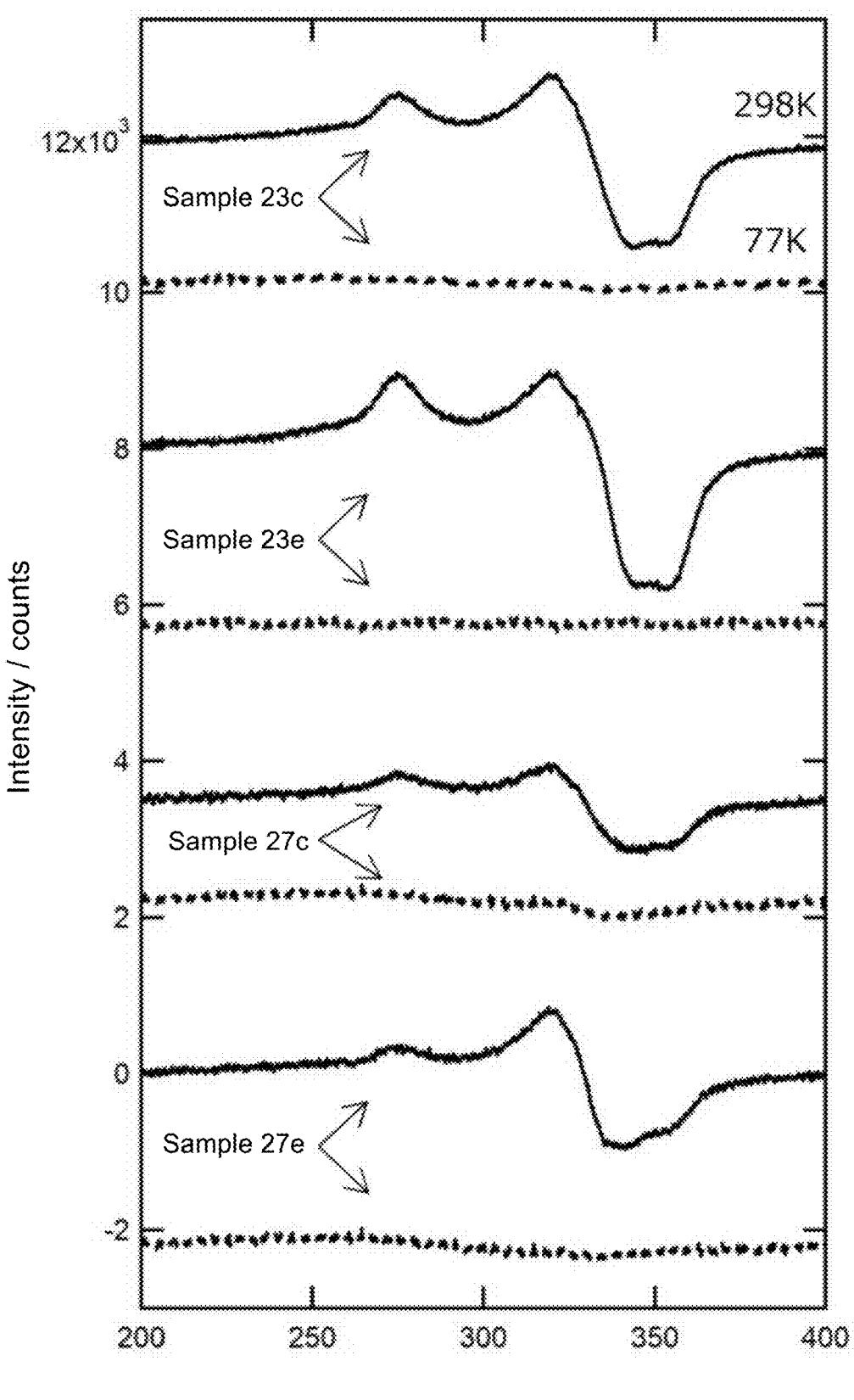
Magnetic field / mT

[Figure 10]

[Figure 11]
(a) x = 0.2, y = 0.5　(as prepared)
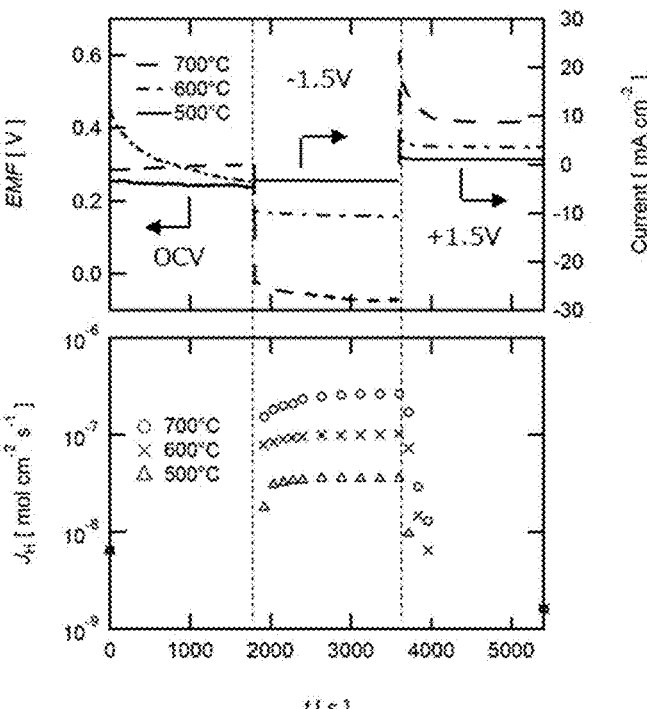
(b) x = 0.2, y = 0.5　(after hydrogen introduction process)
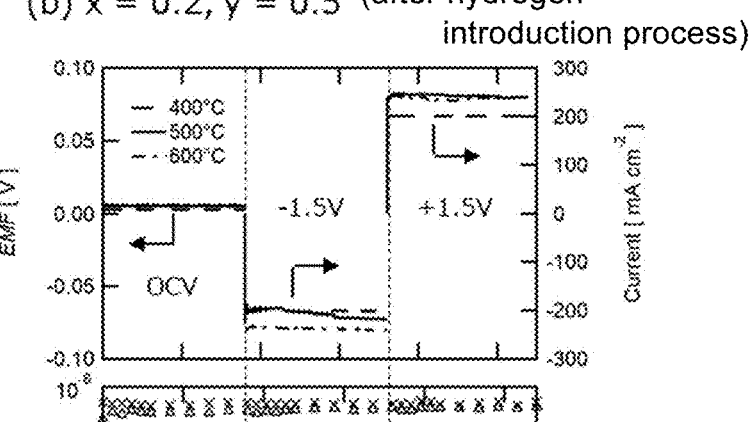
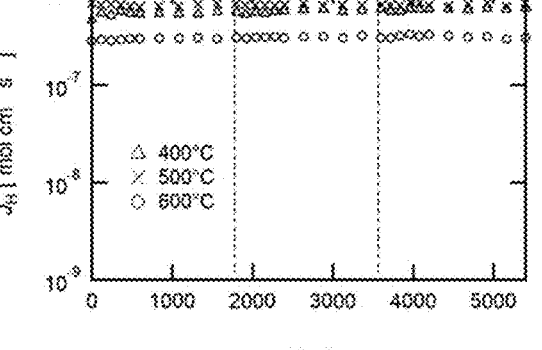

[Figure 12]
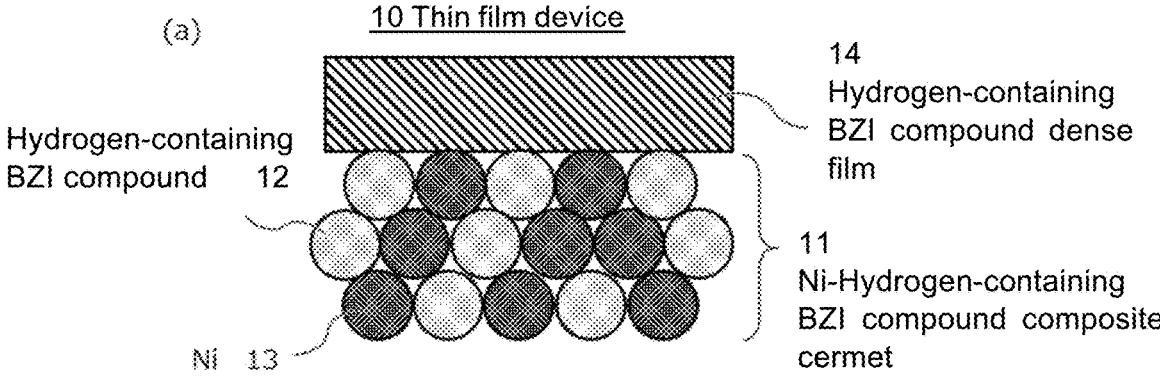
(a)
10 Thin film device
14
Hydrogen-containing
BZI compound dense
film
Hydrogen-containing
BZI compound    12
11
Ni-Hydrogen-containing
BZI compound composite
cermet
Ni    13
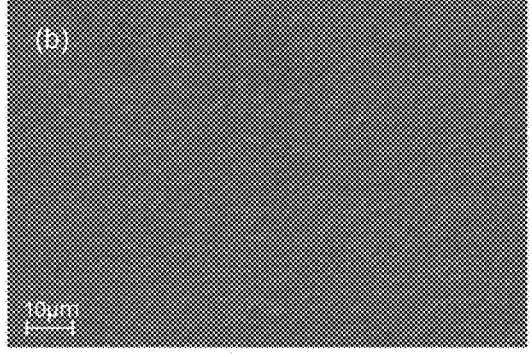
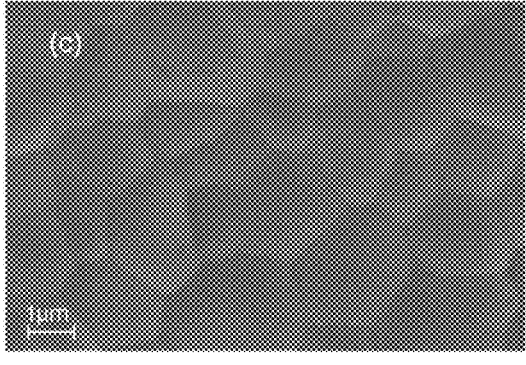
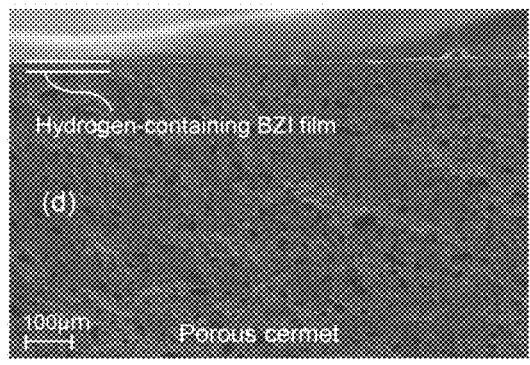
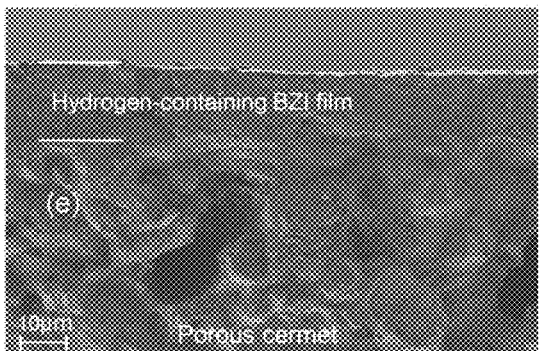

[Figure 13]
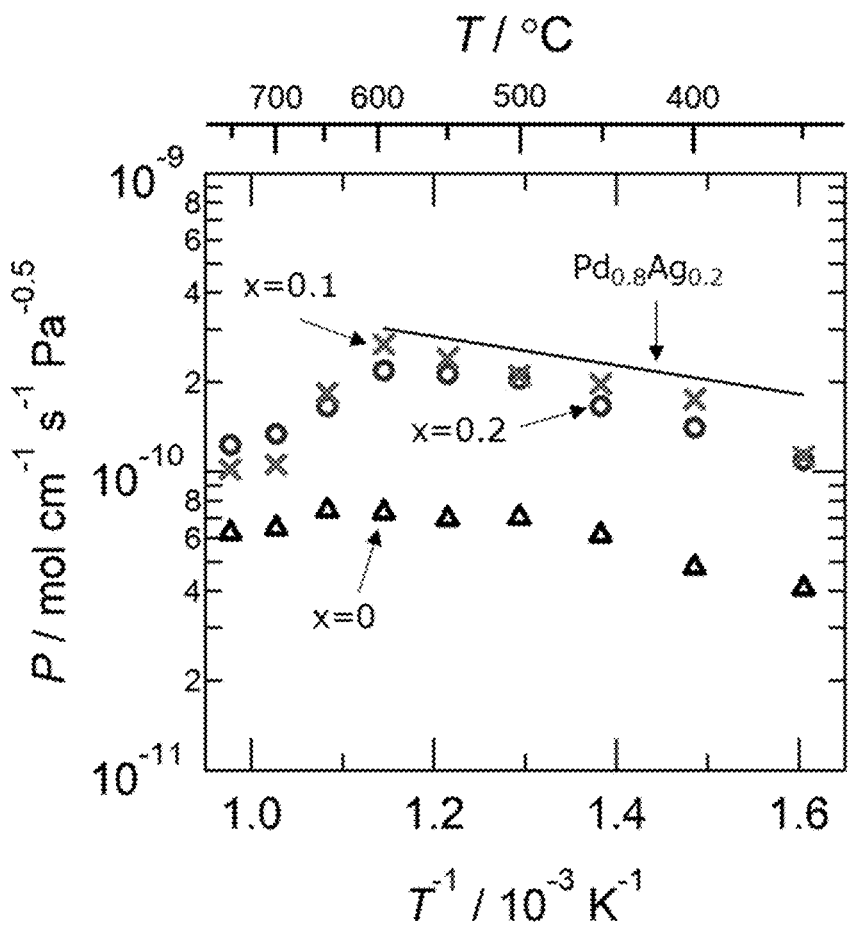

[Figure 14]
(a)    20 Fuel cell
24 LSCF cathode (30 μm)
23 BZCY electrolyte thin film (1 μm)
22 Hydrogen-containing BZI compound dense film (20 μm)
21 Ni-Hydrogen-containing BZI compound composite cermet
Hydrogen permeable anode
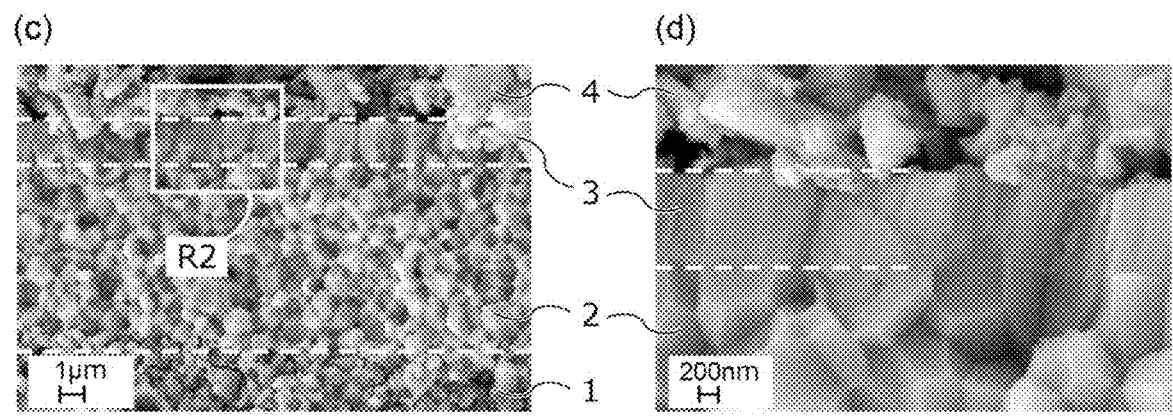
(b)
4
3
2
R1
1
10μm
(c)
4
3
R2
2
1
1μm
(d)
4
3
2
1
200nm

[Figure 15]
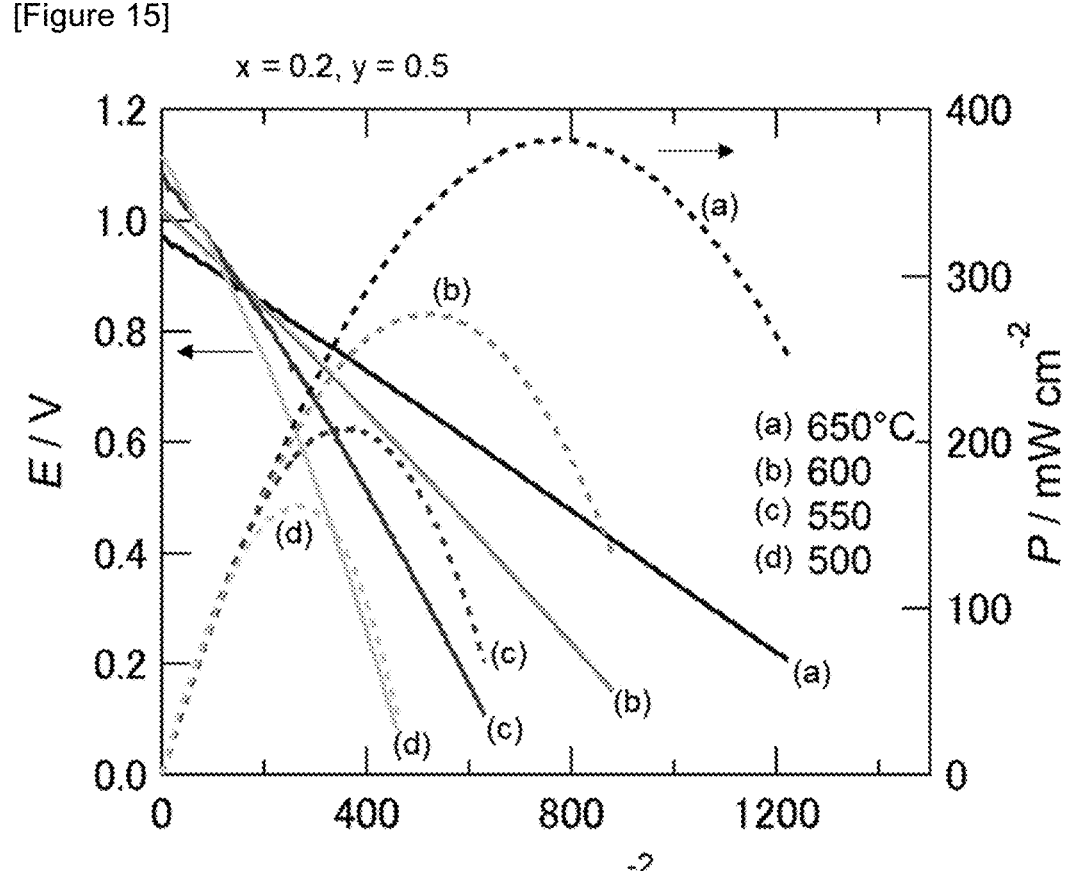

HYDROGEN PERMEABLE MATERIAL

TECHNICAL FIELD

The present invention relates to a hydrogen permeable material and uses thereof.

CROSS REFERENCE TO RELATED APPLICATIONS

This application claims priority to Japan Patent Application No. 2021-039946, filed on Mar. 12, 2021, the entire contents of which are incorporated herein by reference.

BACKGROUND ART

A material that selectively permeates hydrogen (hydrogen permeable material) is useful not only as a separation membrane for hydrogen generation but also as a thermo-catalytic reactor or a fuel electrode of a fuel cell. Methods using hydrogen permeable membranes made of hydrogen storage alloys as such a material are studied, but since these alloys cause severe hydrogen embrittlement, the membrane structures are broken in several hours from the start of hydrogen separation (Non-Patent Literature 1). Only Pd alloy films such as $Pd_{0.8}Ag_{0.2}$ shows stable hydrogen permeability without causing the severe hydrogen embrittlement (Non-Patent Literatures 2 and 3). However, Pd is a precious metal with low reserves, and there are many challenges for large-scale applications in terms of cost and stable supply.

Therefore, there is a need for the hydrogen permeable material based on a completely new principle that replaces the hydrogen dissolution of metals.

Recently, TiN polycrystalline film is reported as the hydrogen permeable material that can be used at relatively low temperature (Non-Patent Literatures 4 and 5). In addition, cermet materials which is imparted proton-electron $(H^+-e^-)$ mixed conductivity by combining proton-conductive oxides $(BaZr_{1-x}Ce_{0.9-x}M_{0.2}O_3; M=Y, Sc$ and rare earth metals) and electron-conductive metals (such as Ni, Cu), have attracted attention as the hydrogen permeable material other than Pd alloys that can be used in high temperature environments (Non-Patent Literature 6).

Non-Patent Literature 1: N. A. Al-Mufachi et al., Renewable and Sustainable Energy Reviews, 2015, 47, 540-551
Non-Patent Literature 2: Donglai Xie et al., International Journal of Hydrogen Energy, 2011, 36, 1014-1026
Non-Patent Literature 3: Gerhard L. Holleck, Journal of Physical Chemistry, 1970, 74, 503-511
Non-Patent Literature 4: Chiharu Kura et al., Nature Energy, 2017, 2, 786-794
Non-Patent Literature 5: Chiharu Kura et al., Journal of Materials Chemistry A, 2018, 6, 2730-2741
Non-Patent Literature 6: N. Kochetova et al., RSC Advances, 2016, 6, 73222-73268
All contents in Non-Patent Literatures 1 to 6 are incorporated herein by reference.

SUMMARY OF INVENTION

Technical Problem

However, in the cermet material as described above, since the bonding energy between lattice oxygen-protons in the ceramic solid is 50 kJ/mol and very large, it is possible to generate a high-flux only in the temperature range of 700° C.

or more, and it is difficult to obtain sufficient hydrogen permeability in the temperature range of 600° C. or less.

The present invention was made in view of the above problems, and an object of the present invention is to provide a novel hydrogen permeable material having excellent hydrogen permeability even in typical hydrocarbon modification process conditions, i.e., the temperature range of 600° C. or less and a water vapor-containing atmosphere.

Another object of the present invention is to provide uses of the hydrogen permeable material of the present invention, and particularly to provide a fuel cell using the hydrogen permeable material of the present invention.

Solution to Problem

The present invention for solving the problem above is as follows.

[1]

A hydrogen permeable material comprising a perovskite type compound represented by the following general formula (1a):
[Chemical formula 1]

$$M_{1-x}Zr_{1-y}In_yO_{3-x-0.5y-w} \quad (1a)$$

in Formula (1a), M is at least one alkaline earth metal selected from the group consisting of Ba, Sr and Ca,
x is a numerical value of 0 or more and 0.3 or less,
y is a numerical value of more than 0 and 0.75 or less,
w is a value at which an average valence of In is +1.0 or more and +2.5 or less,
y≥w.

[2]

The hydrogen permeable material according to [1], wherein In is In(I), or In(I) and In(II), or In(II) and In(III), or In(I) and In(III), or In(I), In(II) and In(III):
wherein In(I) is In with a valence of +1,
In(II) is In with a valence of +2,
In(III) is In with a valence of +3.

[3]

The hydrogen permeable material according to [2], wherein the perovskite type compound represented by the general formula (1a) is represented by the following general formula (1b):
[Chemical formula 2]

$$M_{1-x}Zr_{1-y}In(I)_wIn(III)_{y-w}O_{3-x-0.5y-w} \quad (1b).$$

[4]

The hydrogen permeable material according to [2], wherein the perovskite type compound represented by the general formula (1a) comprises In(II) and is represented by the following general formula (1c) or general formula (1d):
[Chemical formula 3]

$$M_{1-x}Zr_{1-y}In(II)_{2w}In(III)_{y-2w}O_{3-x-0.5y-w} \quad (1c)$$

in Formula (1c), y>2w;

$$M_{1-x}Zr_{1-y}In(I)_{2w-y}In(II)_{2y-2w}O_{3-x-0.5y-w} \quad (1d)$$

in Formula (1d), y≤2w.

[5]

The hydrogen permeable material according to any one of [1] to [4], wherein the average valence of In is an average valence determined based on a mass change in a thermal analysis of the perovskite type compound.

[6]

The hydrogen permeable material comprising the perovskite type compound containing hydrogen (hereinafter referred to as "hydrogen-containing perovskite type compound"), which is the perovskite type compound represented by the general formula (1a) according to [1] containing hydride ion (H$^-$) and in which a molar ratio (n/w) of the content n of the hydride ion and w is 2 or less.

[7]

The hydrogen permeable material according to [6], wherein the hydrogen-containing perovskite type compound is represented by the following general formula (2a):

[Chemical formula 4]

$$M_{1-x}Zr_{1-y}In_yO_{3-x-0.5y-w}H_n \qquad (2a)$$

in Formula (2a), M is at least one alkaline earth metal selected from the group consisting of Ba, Sr and Ca, H is a hydride ion, x is a numerical value of 0 or more and 0.3 or less, y is a numerical value of more than 0 and 0.75 or less, w is a value at which the average valence of In is more than +1.0 and +3.0 or less, y≥w and n/w≤2.

[8]

The hydrogen permeable material according to [7], wherein In is In(I), or In(I) and In(II), or In(II) and In(III), or In(I) and In(III), or In(I), In(II) and In(III):

wherein In(I) is In with a valence of +1,

In(II) is In with a valence of +2,

In(III) is In with a valence of +3.

[9]

The hydrogen permeable material according to [8], wherein the hydrogen-containing perovskite type compound represented by the general formula (2a) is represented by the following general formula (2b):

[Chemical formula 5]

$$M_{1-x}Zr_{1-y}In(I)_{w-0.5n}In(III)_{y-w+0.5n}O_{3-x-0.5y-w}H_n \qquad (2b).$$

[10]

The hydrogen permeable material according to [8], wherein the hydrogen-containing perovskite type compound represented by the general formula (2a) comprises In(II) and is represented by the following general formula (2c) or general formula (2d):

[Chemical formula 6]

$$M_{1-x}Zr_{1-y}In(II)_{2w-n}In(III)_{y-2w+n}O_{3-x-0.5y-w}H_n \qquad (2c)$$

in Formula (2c), y>2w;

$$M_{1-x}Zr_{1-y}In(I)_{2w-y-n}In(II)_{2y-2w+n}O_{3-x-0.5y-w}H_n \qquad (2d)$$

in Formula (2d), y≤2w, 2w−y−n≥0.

[11]

The hydrogen permeable material according to any one of [6] to [10], wherein the content of the hydride ion in the hydrogen-containing perovskite type compound is determined by a secondary ion mass spectrometry measurement or a neutron diffraction measurement.

[12]

The hydrogen permeable material comprising a hydrate of the perovskite type compound according to any one of [1] to [5] or a hydrate of the hydrogen-containing perovskite type compound according to any one of [6] to [11].

[13]

The hydrogen permeable material according to [12], wherein the hydrate is a hydrate represented by any one of the following general formulas (3a) to (3d) or any one of the following general formulas (4a) to (4d):

[Chemical formula 7]

$$M_{1-x}Zr_{1-y}In_yO_{3-x-0.5y-w-l}(OH)_{2l} \qquad (3a)$$

$$M_{1-x}Zr_{1-y}In(I)_wIn(III)_{y-w}O_{3-x-0.5y-w-l}(OH)_{2l} \qquad (3b)$$

$$M_{1-x}Zr_{1-y}In(II)_{2w}In(III)_{y-2w}O_{3-x-0.5y-w-l}(OH)_{2l} \qquad (3c)$$

$$M_{1-x}Zr_{1-y}In(I)_{2w-y}In(II)_{2y-2w}O_{3-x-0.5y-w-l}(OH)_{2l} \qquad (3d)$$

$$M_{1-x}Zr_{1-y}In_yO_{3-x-0.5y-w-l}(OH)_{2l}H_n \qquad (4a)$$

$$M_{1-x}Zr_{1-y}In(I)_{w-0.5n}In(III)_{y-w+0.5n}O_{3-x-0.5y-w-l}(OH)_{2l}H_n \qquad (4b)$$

$$M_{1-x}Zr_{1-y}In(II)_{2w-n}In(III)_{y-2w+n}O_{3-x-0.5y-w-l}(OH)_{2l}H_n \qquad (4c)$$

$$M_{1-x}Zr_{1-y}In(I)_{2w-y-n}In(II)_{2y-2w+n}O_{3-x-0.5y-w-l}(OH)_{2l}H_n \qquad (4d)$$

wherein Formula (3a) represents the hydrate of the compound represented by Formula (1a), and M, x, y and w in Formula (3a) are the same meaning as those in Formula (1a);

Formula (3b) represents the hydrate of the compound represented by Formula (1b), and M, In(I), In(III), x, y and w in Formula (3b) are the same meaning as those in Formula (1b);

Formula (3c) represents the hydrate of the compound represented by Formula (1c), and M, In(II), In(III), x, y and w in Formula (3c) are the same meaning as those in Formula (1c);

Formula (3d) represents the hydrate of the compound represented by Formula (1d), and M, In(I), In(II), x, y and w in Formula (3d) are the same meaning as those in Formula (1d);

Formula (4a) represents the hydrate of the compound represented by Formula (2a), and M, H with subscript n, x, y, w and n in Formula (4a) are the same meaning as those in Formula (2a);

Formula (4b) represents the hydrate of the compound represented by Formula (2b), and M, In(I), In(III), H with subscript n, x, y, w and n in Formula (4b) are the same meaning as those in Formula (2b);

Formula (4c) represents the hydrate of the compound represented by Formula (2c), and M, In(II), In(III), H with subscript n, x, y, w and n in Formula (4c) are the same meaning as those in Formula (2c);

Formula (4d) represents the hydrate of the compound represented by Formula (2d), and M, In(I), In(II), H with subscript n, x, y, w and n in Formula (4d) are the same meaning as those in Formula (2d);

l is a positive value that satisfies l<x+0.5y+w.

[14]

The hydrogen permeable material according to any one of [1] to [13], wherein a part of Zr and In, which are B-site element in the perovskite type compounds represented by the general formulas (1a) to (1d), the hydrogen-containing perovskite type compounds represented by the general formulas (2a) to (2d), or the hydrate represented by the general formulas (3a) to (3d) or (4a) to (4d), is substituted with at least one element selected from the group consisting of rare earth elements, Ni and Zn.

[15]

A composite member having a hydrogen permeable layer consisting of the hydrogen permeable material according to any one of [1] to [14] on at least a portion of a surface of a porous substrate.

[16]

The composite member according to [15], wherein the porous substrate is a cermet substrate, and the ceramic component of the cermet substrate is the hydrogen permeable material according to any one of [1] to [14].

[17]

A fuel cell comprising an anode layer containing the hydrogen permeable material according to any one of [1] to [14], an electrolyte layer, and a cathode layer, on at least a portion of a major surface of a porous substrate in this order.

[18]

The fuel cell according to [17], wherein the porous substrate and the anode layer are made of the composite member according to [15] or [16].

[19]

The fuel cell according to [17] or [18], wherein the electrolyte layer consists of $BaZr_xCe_{1-x-z}Y_zO_3$, wherein x=0.1 to 0.8, z=0.1 to 0.25, x+z 1.0.

Furthermore, the present specification also discloses a method for producing a perovskite type compound represented by the general formula (1a) to (1d) contained in the hydrogen permeable material, and a method for producing a hydrogen-containing perovskite type compound which is the perovskite type compound with introduced hydride ion, which are described below.

[P1]

A method for producing a perovskite type compound represented by the following general formula (1a) by heating a perovskite type compound represented by the following general formula (5a) and/or a hydrate thereof at 600° C. or more in a hydrogen atmosphere:

[Chemical formula 8]

$$M_{1-x}Zr_{1-y}In_yO_{3-x-0.5y-w} \tag{1a}$$

$$M_{1-x}Zr_{1-y}In_yO_{3-x-0.5y} \tag{5a}$$

in the general formulas, M is at least one alkaline earth metal selected from the group consisting of Ba, Sr and Ca, x is a numerical value of 0 or more and 0.3 or less, y is a numerical value of more than 0 and 0.75 or less, w is a value at which an average valence of In is +1.0 or more and +2.5 or less, y≥w.

[P2]

The producing method according to [P1], wherein In in Formula (1a) is In(I), or In(I) and In(II), or In(II) and In(III), or In(I) and In(III), or In(I), In(II) and In(III):

wherein In(I) is In with a valence of +1,

In(II) is In with a valence of +2,

In(III) is In with a valence of +3.

[P3]

The producing method according to [P2], wherein the perovskite type compound represented by the general formula (1a) is represented by the following general formula (1b):

[Chemical formula 9]

$$M_{1-x}Zr_{1-y}In(I)_wIn(III)_{y-w}O_{3-x-0.5y-w} \tag{1b}$$

[P4]

The producing method according to [P2], wherein the perovskite type compound represented by the general formula (1a) comprises In(II) and is represented by the following general formula (1c) or general formula (1d):

[Chemical formula 10]

$$M_{1-x}Zr_{1-y}In(II)_{2w}In(III)_{y-2w}O_{3-x-0.5y-w} \tag{1c}$$

in Formula (1c), y>2w;

$$M_{1-x}Zr_{1-y}In(I)_{2w-y}In(II)_{2y-2w}O_{3-x-0.5y-w} \tag{1d}$$

in Formula (1d), y≤2w.

[P5]

The producing method according to any one of [P1] to [P4], wherein the hydrogen atmosphere does not contain water.

[P6]

A method for producing a hydrogen-containing perovskite type compound, comprising the steps of exposing a perovskite type compound represented by the following general formula (1a) to a hydrogen atmosphere at a temperature of less than 600° C. to obtain the hydrogen-containing perovskite type compound, which is the perovskite type compound represented by the general formula (1a) containing hydride ion (H⁻) and in which a molar ratio (n/w) of the content n of the hydride ion and w is 2 or less:

[Chemical formula 11]

$$M_{1-x}Zr_{1-y}In_yO_{3-x-0.5y-w} \tag{1a}$$

wherein M is at least one alkaline earth metal selected from the group consisting of Ba, Sr and Ca, x is a numerical value of 0 or more and 0.3 or less, y is a numerical value of more than 0 and 0.75 or less, w is a value at which an average valence of In is +1.0 or more and +2.5 or less, y≥w.

[P7]

The producing method according to [P6], wherein the hydrogen-containing perovskite type compound is represented by the following general formula (2a):

[Chemical formula 12]

$$M_{1-x}Zr_{1-y}In_yO_{3-x-0.5y-w}H_n \tag{2a}$$

in Formula (2a), M is at least one alkaline earth metal selected from the group consisting of Ba, Sr and Ca, H is a hydride ion, x is a numerical value of 0 or more and 0.3 or less, y is a numerical value of more than 0 and 0.75 or less, w is a value at which the average valence of In is more than +1.0 and +3.0 or less, y≥w and n/w≤2.

[P8]

The producing method according to [P7], wherein In in Formula (2a) is In(I), or In(I) and In(II), or In(II) and In(III), or In(I) and In(III), or In(I), In(II) and In(III):

wherein In(I) is In with a valence of +1,

In(II) is In with a valence of +2,

In(III) is In with a valence of +3.

[P9]

The producing method according to [P8], wherein the hydrogen-containing perovskite type compound represented by the general formula (2a) is represented by the following general formula (2b):

[Chemical formula 13]

$$M_{1-x}Zr_{1-y}In(I)_{w-0.5n}In(III)_{y-w+0.5n}O_{3-x-0.5y-w}H_n \tag{2b}$$

[P10]

The producing method according to [P8], wherein the hydrogen-containing perovskite type compound represented by the general formula (2a) comprises In(II) and is represented by the following general formula (2c) or general formula (2d):

[Chemical formula 14]

$$M_{1-x}Zr_{1-y}In(II)_{2w-n}In(III)_{y-2w+n}O_{3-x-0.5y-w}H_n \tag{2c}$$

in Formula (2c), y>2w;

$$M_{1-x}Zr_{1-y}In(I)_{2w-y-n}In(II)_{2y-2w+n}O_{3-x-0.5y-w}H_n \tag{2d}$$

in Formula (2d), y≤2w, 2w−y−n≥0.

[P11]

The producing method according to any one of [P1] to [P10], wherein a part of B-site element in the perovskite type compounds represented by the general formulas (1a) to (1d) is substituted with at least one element selected from the group consisting of rare earth elements, Ni and Zn.

[P12]

The producing method according to any one of [P7] to [P10], wherein a part of B-site element in the hydrogen-containing perovskite type compounds represented by the general formulas (2a) to (2d) is substituted with at least one element selected from the group consisting of rare earth elements, Ni and Zn.

Effect of Invention

According to the present invention, it is possible to provide a material having excellent hydrogen permeability even in the temperature range of 600° C. or less and in the water vapor-containing atmosphere. Furthermore, to use the hydrogen permeable material of the present invention allows to provide a fuel cell that operates even in the temperature range of 600° C. or less and in the water vapor-containing atmosphere.

BRIEF DESCRIPTION OF DRAWINGS

FIG. 1 shows powder X-ray diffraction (XRD) patterns of samples.

FIG. 2 shows XRD patterns of samples.

FIG. 3 shows a relationship between temperature and electrical conductivity for samples.

FIG. 4 shows thermogravimetric curves of samples.

FIG. 5 shows In—K edge X-ray absorption fine structure (XAFS) spectrums of samples.

FIG. 6 shows nuclear magnetic resonance (NMR) measurement data of samples.

FIG. 7 shows secondary ion mass spectrometry (SIMS) profiles of samples.

FIG. 8 shows neutron ray diffraction (NRD) patterns and Rietveld calculation profiles of samples.

FIG. 9A is a conceptual diagram showing positions of hydrogen atoms in a perovskite type BZI compound.

FIG. 9B shows electron spin resonance (ESR) spectrums of samples.

FIG. 10 is a conceptual diagram showing a measurement system for hydrogen permeability.

FIG. 11 shows measurement data of hydrogen permeation rate of samples.

FIG. 12(a) is a conceptual diagram of a thin film device fabricated in Examples. The (b) to (e) of FIG. 12 are scanning electron microscope (SEM) pictures at a cross-section of the thin film device shown in FIG. 12(a).

FIG. 13 is a graph showing a relationship between temperature and hydrogen permeability of the thin film device shown in FIG. 12.

FIG. 14(a) is a conceptual diagram of a fuel cell fabricated in Examples. The (b) to (d) of FIG. 14 are cross-sectional SEM pictures of the fuel cell.

FIG. 15 shows an output characteristic (current-voltage-output curve) of the fuel cell.

DESCRIPTION OF EMBODIMENTS

A perovskite type compound comprised in the hydrogen permeable material of the present invention is a perovskite type compound represented by the following general formulas (1a) to (1d), a hydrogen-containing perovskite type compound, which is the perovskite type compound represented by the general formulas (1a) to (1d) containing hydride ion (H⁻), or a hydrate thereof, or a mixture thereof.

<Perovskite Type Compound>

The perovskite type compound that may be included in the hydrogen permeable material of the present invention is represented by the following general formula (1a).

[Chemical formula 15]

$$M_{1-x}Zr_{1-y}In_yO_{3-x-0.5y-w} \tag{1a}$$

In Formula (1a), M is an element of A-site of a perovskite type structure and is at least one alkaline earth metal selected from the group consisting of Ba, Sr and Ca, and M is preferably Ba or at least partially Ba in terms of providing the hydrogen-containing perovskite type compound having a desired hydrogen permeability. When M is Ba and either or both of Sr and Ca, Ba:(Sr+Ca) is preferably in the range of 1:0.1-1. The x means a lost ratio of alkaline earth metal M from the stoichiometric ratio and is a numerical value of 0 or more and 0.3 or less, preferably 0.05 or more and 0.25 or less, more preferably 0.07 or more and 0.23 or less in terms of providing the hydrogen-containing perovskite type compound having a desired hydrogen permeability.

In Formula (1a), the elements of B-site of the perovskite type structure are Zr and In. In may take a valence condition of In(I), In(II) or In(III). In(I) is In with a valence of +1, In(II) is In with a valence of +2, and In(III) is In with a valence of +3. That is, In, when ionized, can take on the valence of +1, +2 or +3, with +3 usually being the more stable valence. The w is a value at which an average valence of In is +1.0 or more and +2.5 or less. When the all amount of In is In(I), the average valence is +1.0 and (1×w+3×(y−w))/y=1.0, so w=y. In addition, when the average valence of In is +2.5, w=y/4. This is because, in a typical perovskite type compound, all In is In(III) and the average valence is +3.0, but as the average valence decreases from +3.0 to +2.5, an amount of oxygen (the valence of −2.0) corresponding to the 0.5 decrease is lost to balance the charge. Alternatively, assuming that In is In(I) and In(III), w=y/4 can be derived from the equation (1×w+3×(y−w))/y=2.5 with respect to the average valence based on the compositional ratio of the general formula (1b) described below. As the average valence of In in the perovskite type compound is closer to +1, the capacity to introduce the hydride ion increases. The ratio (w/y) of w to y in Formula (1a) is preferably from 0.30 to 0.97, more preferably from 0.35 to 0.95, and still more preferably from 0.40 to 0.93 in terms of providing the hydrogen-containing perovskite type compound having excellent hydrogen permeability. The average valence of In in the perovskite type compound represented by Formula (1a) is preferably +1.05 or more and +2.30 or less, more preferably +1.10 or more and +2.10 or less, still more preferably +1.15 or more and +2.00 or less in terms of providing the hydrogen-containing perovskite type compound having excellent hydrogen permeability.

The average valence of In is obtained by the following formula in terms of the charge balance of the entire composition.

$$\text{Average valence of In} = \tag{Mathematical formula 1}$$
$$-\left[\Sigma \left(\text{valence of } A-\text{site atom} \times \text{ratio}\right) + \Sigma\right.$$
$$\left(\text{valence of } B-\text{site atom excluding In} \times \text{ratio}\right) +$$
$$\left.(-2) \times \text{ratio of oxygen}\right]/\text{ratio of In } (D)$$

In formula D, the symbol Σ represents that if there are more than one A-site atoms in the perovskite structure, the sum is taken for those atoms, and if there are more than one B-site atoms excluding In, the sum is taken for those atoms. The valence of the A-site atoms and the valence of the B-site atoms excluding In are obtained when the atoms are determined. For example, when the A-site atoms is Ba, the valence is +2, and when the B-site atoms is Zr, the valence is +4. The valence of oxygen is −2. The ratio of A-site atoms, the ratio of B-site atoms, and the ratio of oxygen can be determined by performing elemental analysis on the perovskite type compound by a conventional method or SIMS analysis described in Examples. The ratio of oxygen is also determined from an amount of mass change obtained by thermogravimetric analysis of the perovskite type compound in a hydrogen atmosphere.

The total amount y of In including In(I), In(II) and In(III) is a numerical value of more than 0 and 0.75 or less. If y is 0.75 or less, the perovskite type structure can be obtained. However, since the hydrogen-containing perovskite type compound, which is containing hydride ion (H$^-$), is expected to be used under heating, y is preferably 0.55 or less, considering excellent structural stability under heating. On the other hand, in terms of providing the hydrogen-containing perovskite type compound, which is containing hydride ion (H$^-$), y is preferably 0.1 or more, more preferably 0.2 or more, still more preferably 0.3 or more, and further still more preferably 0.4 or more. Wherein y≥w.

In in Formula (1a) may be In(I), or In(I) and In(II), or In(II) and In(III), or In(I) and In(III), or In(I), In(II) and In(III). In in Formula (1a) may in particular be In(I) and In(II), or In(II) and In(III), or In(I) and In(III). The result of ESR measurement as described later demonstrates that In in the perovskite type compound represented by the general formula (1a) is in the state of In(I) and In(III) at about 77K and that In includes In(II) at a room temperature level (298K) or more.

When In is In(I) and In(III), the perovskite type compound represented by the general formula (1a) is represented by the following general formula (1b). When the total amount of In is y, an amount of In(I) is represented by w and an amount of In(III) is represented by y−w.
[Chemical formula 16]

$$M_{1-x}Zr_{1-y}In(I)_wIn(III)_{y-w}O_{3-x-0.5y-w} \quad (1b)$$

Furthermore, the perovskite type compound represented by the general formula (1a) may include In(II) and may be a compound represented by the general formula (1c) or the general formula (1d) below.
[Chemical formula 17]

$$M_{1-x}Zr_{1-y}In(II)_{2w}In(III)_{y-2w}O_{3-x-0.5y-w} \quad (1c)$$

in Formula (1c), y>2w;

$$M_{1-x}Zr_{1-y}In(I)_{2w-y}In(II)_{2y-2w}O_{3-x-0.5y-w} \quad (1d)$$

in Formula (1d), y≤2w.

The compounds represented by the general formulae (1c) and (1d) can also be considered to have an averaged charge between In(I) and In(III) in the perovskite type compound represented by the general formula (1b). That is, the compound represented by the general formula (1c) can be considered to be one in which In(II) is generated by charge averaging between In(I) and In(III) when In(I) amount is less than In(III) amount (y>2w) in the compound represented by general formula (1b). In addition, the compound represented by the general formula (1d) can be considered to be one in which In(II) is generated by charge averaging between In(I) and In(III) when In(I) amount is equal to or more than In(III) amount (y≤2w) in the compound represented by the general formula (1b). Thus, the compound represented by the general formula (1b) and the compound represented by the general formula (1c) or (1d) differ from each other only in the valence state of In and are equivalent as compounds with the same composition.

In the perovskite type compound represented by the formulas (1a) to (1d), a part of the B-site element Zr and In may be substituted with at least one element selected from the group consisting of rare earth elements, Ni and Zn. The content of these elements may be within a range that does not impair the structure and hydrogen permeability of the perovskite type compound in the hydrogen permeable material of the present invention, and may be, for example, 0.05 mol or less, preferably 0.02 mol or less. The rare earth elements are specifically Sc and Y, and La, Ce, Pr, Nd, Pm, Sm, Eu, Gd, Tb, Dy, Ho, Er, Tm, Yb, Lu, which are elements belonging to lanthanoids. When the part of the B-site element is substituted with Ni and Zn, a strength of sintered bodies of the perovskite type compound can be increased. Furthermore, when the part of the B-site element is substituted with the rare earth element, an effect of expanding ranges of stability temperature and hydrogen partial pressure of the perovskite phase containing In, which is in a low average valence state due to the inclusion of In(I) and others, is expected.

The determination of the contents of the metal elements (M, Zr, In, rare earth elements, Ni and Zn) in the perovskite type compound represented by the general formula (1a) or the like, the hydrogen-containing perovskite type compound represented by the general formula (2a) or the like, and hydrates thereof can be performed by, for example, a conventional method of elemental analysis of metal elements, such as an atomic absorption and a titration methods, or can be performed by SIMS measurement based on comparisons with SIMS profiles of reference samples.
<Hydrogen-Containing Perovskite Type Compound>

The hydrogen-containing perovskite type compound which may be comprised in the hydrogen permeable material of the present invention is a compound which is the perovskite type compound represented by the general formula (1a) to (1d) containing hydride ion (H$^-$), wherein a molar ratio (n/w) of the content n of the hydride ion and w is 2 or less. Moreover, w is a value at which the average valence of In is more than +1.0 and +3.0 or less.

The hydrogen-containing perovskite type compound can be represented by the following general formula (2a).
[Chemical formula 18]

$$M_{1-x}Zr_{1-y}In_yO_{3-x-0.5y-w}H_n \quad (2a)$$

In Formula (2a), M is at least one alkaline earth metal selected from the group consisting of Ba, Sr and Ca;

H is a hydride ion, x is a numerical value of 0 or more and 0.3 or less, y is a numerical value of more than 0 and 0.75 or less, w is a value at which the average valence of In is more than +1.0 and +3.0 or less, y≥w and n/w≤2.

As can be seen from a comparison of the general formulas (1a) and (2a), for example, an amount of oxygen loss is usually not changed even when the hydride ion is introduced into the compound. The ratio (w/y) of w to y in the general formula (2a) is from 0.25 to 1, preferably from 0.30 to 0.97, more preferably from 0.35 to 0.95, and still more preferably from 0.40 to 0.93 in terms of providing the hydrogen-containing perovskite type compound having excellent hydrogen permeability. The average valence of In in the hydrogen-containing perovskite type compound is preferably +1.1 or more and +2.9 or less, more preferably +1.2 or more and +2.8 or less, still more preferably +1.3 or more and +2.7 or less in terms of providing the hydrogen-containing perovskite type compound having excellent hydrogen permeability. The average valence of In in the hydrogen-containing perovskite type compound is obtained by the following formula in terms of the charge balance of the entire composition.

$$\text{Average valence of In} = \qquad \text{[Mathematical formula 2]}$$
$$-\left[\Sigma \left(\text{valence of } A\text{-site atom} \times \text{ratio}\right) + \Sigma\right.$$
$$\left(\text{valence of } B\text{-site atom excluding In} \times \text{ratio}\right) +$$
$$(-2) \times \text{ratio of oxygen} + (+1) \times \text{ratio of H}^+ +$$
$$\left.(-1) \times \text{ratio of H}^-\right]/\text{ratio of In } (D')$$

The formula D' is the same as the formula D except that the term $[+(+1) \times \text{ratio of W} + (-1) \times \text{ratio of H}^-]$ is added. The term "$(+1) \times \text{ratio of H}^+$" indicates that an influence of the charge of the hydrogen ion with the valence of +1, if present, is taken into account, and the term "$(-1) \times \text{ratio of H}^-$" indicates that an influence of the charge of the hydride ion with the valence of $-1$, if present, is taken into account. The ratio of $H^+$ is substantially negligible, as described below, and the ratio of $H^-$ can be determined from SIMS and NRD measurements.

In the general formula (2a), H represents a hydride ion, and n represents the content ratio of the hydride ion. As can be seen from Formulas (1a) and (2a), the hydride ion ($H^-$) in the hydrogen-containing perovskite type compound are present such that the hydride ion ($H^-$) balances the difference in charge between In(III) and In(I), etc. As the amount of hydride ion ($H^-$) increases, the amount of In(I) or In(II) decreases and the amount of In(II) or In(III) increases so that the average valence increases. In this way, the negative charge of the hydride ion ($H^-$) is offset by the positive charge caused by the increase in the average valence due to the increase in the amount of In(III) or the like, and the charge is balanced. Therefore, the upper limit of the content of the hydride ion ($H^-$) in the hydrogen-containing perovskite type compound is determined by the content w of In(I) and the average valence of In, and the molar ratio (n/w) is 2 or less (n/w≤2). The smallest w$-$0.5n is 0 (zero).

In in Formula (2a) may be In(I), or In(I) and In(II), or In(II) and In(III), or In(I) and In(III), or In(I), In(II) and In(III). In in Formula (2a) may in particular be In(I) and In(II), or In(II) and In(III), or In(I) and In(III).

When In is In(I) and In(III), the hydrogen-containing perovskite type compound represented by the general formula (2a) is represented by the following general formula (2b).
[Chemical formula 19]

$$M_{1-x}Zr_{1-y}In(I)_{w-0.5n}In(III)_{y-w+0.5n}O_{3-x-0.5y-w}H_n \qquad (2b).$$

The molar ratio (n/(w$-$0.5n)) of the hydride ion to In(I) in the general formula (2b) is preferably from 0.01 to 20, more preferably from 0.1 to 10.

In addition, the charge may be averaged between In(I) and In(III) in the hydrogen-containing perovskite type compound represented by the general formula (2b), resulting in In(II). That is, the hydrogen-containing perovskite type compound represented by the general formula (2a) may comprise In(II) and be represented by the following general formula (2c) or general formula (2d).
[Chemical formula 20]

$$M_{1-x}Zr_{1-y}In(II)_{2w-n}In(III)_{y-2w+n}O_{3-x-0.5y-w}H_n \qquad (2c)$$

in Formula (2c), y>2w;

$$M_{1-x}Zr_{1-y}In(I)_{2w-y-n}In(II)_{2y-2w+n}O_{3-x-0.5y-w}H_n \qquad (2d)$$

in Formula (2d), y≤2w, 2w-y-n≥0.

The compound represented by the general formula (2c) can be considered to be one in which In(II) is generated by charge averaging between In(I) and In(III) when In(I) amount is less than In(III) amount (y>2w) in the compound represented by general formula (2b). In addition, the compound represented by the general formula (2d) can be considered to be one in which In(II) is generated by charge averaging between In(I) and In(III) when In(I) amount is equal to or more than In(III) amount (y≤2w) in the compound represented by general formula (2b). Thus, the compound represented by the general formula (2b) and the compound represented by the general formula (2c) or (2d) differ from each other only in the valence state of In and are equivalent as compounds with the same composition.

The hydride ion in the hydrogen-containing perovskite type compound is present in at least a part of the interstitial positions near the (100), (001) and (010) face centers and oxygen vacancy positions in the perovskite type structure. FIG. 9A shows a conceptual diagram of one aspect of the hydrogen-containing perovskite type compound. $H_i$ shown in (a) is a proton at a position near the lattice oxygen, $H_{fcc}$ shown in (b) is a hydrogen atom at the interstitial position near the (100), (001) and (010) face centers, and $H_O$ shown in (c) is a hydrogen atom at the oxygen vacancy position. However, the present amount of the proton at the position near the lattice oxygen in the hydrogen-containing perovskite type compound is negligible.

As shown in Table 6, most of deuterium in Sample 23d, which has the composition $BaZr_{0.5}In_{0.5}O_{2.53}H_{0.16}$ (corresponding to the compound represented by Formula (2a) with x=0, y=0.5, w=0.22 and n=0.16), is $D_{fcc}$, and the ratio of $D_O$ is very small. On the other hand, as shown in Table 7, for Sample 27d, which has the composition $Ba_{0.8}Zr_{0.5}In_{0.5}O_{2.28}H_{0.21}$ (corresponding to the compound represented by Formula (2a) with x=0.2, y=0.5, w=0.27 and n=0.21), the amount of $D_O$ is almost the same as the amount of $D_{fcc}$. This result indicates that the loss of Ba (x>0) increases the ratio of $D_O$.

The content of the hydride ion in the hydrogen-containing perovskite type compound is determined by a secondary ion mass spectrometry measurement or a neutron diffraction measurement. As for the secondary ion mass spectrometry measurement, see Section 2-2 of Examples. As for the neutron diffraction measurement, see Section 2-3 of Examples.

A part of Zr and In, which are B-site element in the hydrogen-containing perovskite type compound, may be substituted with at least one element selected from the group consisting of rare earth elements, Ni and Zn. The content of these elements may be within a range that does not impair the structure and hydrogen permeability of the hydrogen-containing perovskite type compound, and may be, for example, 0.05 mol or less, preferably 0.02 mol or less. The rare earth elements are specifically Sc and Y, and La, Ce, Pr, Nd, Pm, Sm, Eu, Gd, Tb, Dy, Ho, Er, Tm, Yb, Lu, which are elements belonging to lanthanoids. When the part of the B-site element is substituted with Ni and Zn, a strength of sintered bodies of the perovskite type compound can be increased. Furthermore, when the part of the B-site element is substituted with the rare earth element, an effect of expanding ranges of stability temperature and hydrogen partial pressure of the perovskite phase is expected.

<Hydrate of Perovskite Type Compound>

The hydrogen permeable material of the present invention may be a material containing a hydrate of the perovskite type compound or a hydrate of the hydrogen-containing perovskite type compound. These hydrates may be hydrates represented by any one of the following general formulas (3a) to (3d) or any one of the following general formulas (4a) to (4d).

[Chemical formula 21]

$$M_{1-x}Zr_{1-y}In_yO_{3-x-0.5y-w-l}(OH)_{2l} \tag{3a}$$

$$M_{1-x}Zr_{1-y}In(I)_wIn(III)_{y-w}O_{3-x-0.5y-w-l}(OH)_{2l} \tag{3b}$$

$$M_{1-x}Zr_{1-y}In(II)_{2w}In(III)_{y-2w}O_{3-x-0.5y-w-l}(OH)_{2l} \tag{3c}$$

$$M_{1-x}Zr_{1-y}In(I)_{2w-y}In(II)_{2y-2w}O_{3-x-0.5y-w-l}(OH)_{2l} \tag{3d}$$

$$M_{1-x}Zr_{1-y}In_yO_{3-x-0.5y-w-l}(OH)_{2l}H_n \tag{4a}$$

$$M_{1-x}Zr_{1-y}In(I)_{w-0.5n}In(III)_{y-w+0.5n}O_{3-x-0.5y-w-l}(OH)_{2l}H_n \tag{4b}$$

$$M_{1-x}Zr_{1-y}In(II)_{2w-n}In(III)_{y-2w+n}O_{3-x-0.5y-w-l}(OH)_{2l}H_n \tag{4c}$$

$$M_{1-x}Zr_{1-y}In(I)_{2w-y-n}In(II)_{2y-2w+n}O_{3-x-0.5y-w-l}(OH)_{2l}H_n \tag{4d}$$

wherein Formula (3a) represents the hydrate of the compound represented by Formula (1a), and M, x, y and w in Formula (3a) are the same meaning as those in Formula (1a);

Formula (3b) represents the hydrate of the compound represented by Formula (1b), and M, In(I), In(III), x, y and w in Formula (3b) are the same meaning as those in Formula (1b);

Formula (3c) represents the hydrate of the compound represented by Formula (1c), and M, In(II), In(III), x, y and w in Formula (3c) are the same meaning as those in Formula (1c);

Formula (3d) represents the hydrate of the compound represented by Formula (1d), and M, In(I), In(II), x, y and w in Formula (3d) are the same meaning as those in Formula (1d);

Formula (4a) represents the hydrate of the compound represented by Formula (2a), and M, H with subscript n, x, y, w and n in Formula (4a) are the same meaning as those in Formula (2a);

Formula (4b) represents the hydrate of the compound represented by Formula (2b), and M, In(I), In(III), H with subscript n, x, y, w and n in Formula (4b) are the same meaning as those in Formula (2b);

Formula (4c) represents the hydrate of the compound represented by Formula (2c), and M, In(II), In(III), H with subscript n, x, y, w and n in Formula (4c) are the same meaning as those in Formula (2c);

Formula (4d) represents the hydrate of the compound represented by Formula (2d), and M, In(I), In(II), H with subscript n, x, y, w and n in Formula (4d) are the same meaning as those in Formula (2d);

l is a positive value that satisfies $l < x + 0.5y + w$.

The hydrate of the perovskite type compound and the hydrate of the hydrogen-containing perovskite type compound are obtained by exposing the perovskite type compound and the hydrogen-containing perovskite type compound to the water vapor-containing atmosphere, respectively. Therefore, when a composite member or a fuel cell using the perovskite type compound or the hydrogen-containing perovskite type compound described later is used in the water vapor-containing atmosphere or an atmosphere containing water vapor and hydrogen, at least a part of the perovskite type compound or the hydrogen-containing perovskite type compound becomes the hydrate.

<Hydrogen Permeable Material>

The hydrogen permeable material of the present invention is a hydrogen permeable material containing the perovskite type compound, the hydrogen-containing perovskite type compound, and/or the hydrate thereof. The hydrogen permeable material of the present invention may be any of a composition comprising only the perovskite type compound, the hydrogen-containing perovskite type compound, and/or the hydrate thereof, and a composition containing an additive in addition thereto. The additive may be, for example, oxides or nitrates of Ni, Zn, Co, Cu and the like as a sintering aid. When the perovskite type compound is sintered using nickel oxide (NiO) or zinc oxide (ZnO) as the sintering aid, the perovskite type compound containing Ni or Zn in the B-site of the perovskite type structure is formed by replacing Ni or Zn with a part of Zr or In of the B-site during the sintering.

<Method for Producing Perovskite Type Compound>

The perovskite type compound represented by the general formula (1a) to (1d) can be obtained by heating a perovskite type compound represented by the general formula (5a) and/or a hydrate thereof (hereinafter also referred to as a raw material compound) in a hydrogen atmosphere at 600° C. or more. The perovskite type compound represented by the general formula (5a) is a general ZrIn-containing perovskite type compound. In view of the fact that In usually takes on the valence of +3, the perovskite type compound represented by the general formula (5a) can also be said to be represented by the general formula (5b).

[Chemical formula 22]

$$M_{1-x}Zr_{1-y}In_yO_{3-x-0.5y} \tag{5a}$$

$$M_{1-x}Zr_{1-y}In(III)_yO_{3-x-0.5y} \tag{5b}$$

M, x and y in Formulas (5a) and (5b) are the same meaning as those in Formula (1a).

The raw material compound can be prepared by conventional methods from, for example, metal salts such as carbonates, nitrates, and/or metal oxides (e.g., References 1 and 3).

The raw material compound is heated at 600° C. or more in the hydrogen atmosphere. The hydrogen atmosphere may be 100% hydrogen gas or a mixed gas of hydrogen gas and an inert gas such as argon. In the case of the mixed gas, the content of the hydrogen gas is, for example, 1% or more, preferably 5% or more, and more preferably 10% or more. The hydrogen atmosphere is preferably 100% hydrogen gas in terms of providing the hydrogen-containing perovskite type compound having excellent hydrogen permeability. The hydrogen atmosphere preferably does not contain water. This is because when the hydrogen atmosphere contains water, it tends to prevent the reduction of the average valence of In, such as the formation of In(I) by reduction of In(III). The heating temperature is in the range from 600 to 900° C., preferably from 630 to 870° C., more preferably from 650 to 850° C. The heating time can be appropriately determined depending on the heating temperature and the desired w, and may be, for example, in the range from 0.1 to 50 hours, preferably from 1 to 40 hours, and more preferably from 1.5 to 35 hours. However, it is not intended to be limited to this range.

<Method for Producing Hydrogen-Containing Perovskite Type Compound>

The hydrogen-containing perovskite type compounds represented by the general formulas (2a) to (2d) can be prepared, respectively, by exposing the perovskite type compound represented by the general formulas (1a) to (1d) to the hydrogen atmosphere at a temperature of room temperature or more and less than 600° C. to introduce the hydride ion ($H^-$) into the perovskite type compound represented by the general formulas (1a) to (1d).

The hydrogen atmosphere may be 100% hydrogen gas or a mixed gas of hydrogen gas and an inert gas such as argon. In the case of the mixed gas, the content of the hydrogen gas is, for example, 1% or more, preferably 5% or more, and more preferably 10% or more. The hydrogen atmosphere is preferably 100% hydrogen gas in terms of providing the hydrogen-containing perovskite type compound having excellent hydrogen permeability. The hydrogen atmosphere preferably does not contain water in terms of promoting the introduction of hydrogen.

The exposure temperature to the hydrogen atmosphere is in the range of room temperature or more and less than 600° C., and can be appropriately determined in consideration of the amount of introduction of the hydride ion and the time required for introduction. The exposure temperature to the hydrogen atmosphere is preferably 100° C. or more, and more preferably 200° C. or more in terms of shortening the hydride ion introduction time. On the other hand, the introduction amount of the hydride ion, i.e., the substitution amount with In(I) and In(II), tends to increase as the exposure temperature to the hydrogen atmosphere is reduced to some extent. In view of this, the exposure temperature to the hydrogen atmosphere is 500° C. or less, preferably 400° C. or less. However, the exposure to the hydrogen atmosphere does not need to be performed at a constant temperature, it may be exposed to the hydrogen atmosphere at a temperature in the range of room temperature or more and less than 600° C. The exposure to the hydrogen atmosphere can also be performed in the hydrogen atmosphere, for example by continuously or intermittently lowering the temperature from 600° C. at a predetermined rate. The exposure time to the hydrogen atmosphere can be appropriately determined in consideration of the composition (particularly the amount of In(I) and the amount of In(II)) of the perovskite type compound prior to exposure, a desired amount of the hydride ion, a hydrogen gas concentration of the hydrogen atmosphere, temperature, and the like, and may be, for example, in the range from 0.1 to 24 hours, and preferably in the range from 0.5 to 12 hours. However, it is not intended to be limited to this range.

When the perovskite type compounds represented by the general formulas (1a) to (1d) are exposed to the hydrogen atmosphere in the temperature range from room temperature or more and less than 600° C., the hydrogen gas in the atmosphere is taken into the perovskite type compound and is reduced by In(I) or In(II) to form the hydride ion. With the introduction of the hydride ion, In(I) is oxidized to In(II) or In(III), and In(II) is oxidized to In(III). The hydrogen-containing perovskite type compounds can be represented by the general formulas (2a) to (2d), and the molar ratio (n/w) of the content n of the hydride ion that can be introduced and w is 2 or less. In the general formulas (2a) to (2d), H represents the hydride ion and n represents the hydride ion content. For the general formulas (1a) to (1d), the introduction of n amount of the hydride ion causes a charge transfer among In(I), In(II) and In(III) so that the average valence of In increases, and the content of each of In(I), In(II) and In(III) changes. For example, when In is In(I) and In(III), the introduction of n amount of the hydride ion reduces In(I) of 0.5n and increases In(III) of 0.5n as shown in the general formulas (1b) and (2b).

[Chemical formula 23]

$$M_{1-x}Zr_{1-y}In(I)_w In(III)_{y-w}O_{3-x-0.5y-w} \tag{1b}$$

$$M_{1-x}Zr_{1-y}In(I)_{w-0.5n}In(III)_{y-w+0.5n}O_{3-x-0.5y-w}H_n \tag{2b}$$

Based on results of TG and XAFS measurements shown in Examples, it is believed that the compound represented by $Ba_{1-x}Zr_{1-y}In_y O_{3-x-0.5y}$ is transformed, due to the reduction of In in the hydrogen gas at a temperature of 600° C. or more, to an In-reduced compound represented by $M_{1-x}Zr_{1-y}In_y O_{3-x-0.5y-w}$ (Formula (1a)), such as the In-reduced compound represented by $Ba_{1-x}Zr_{1-y}In(I)_w In(III)_{y-w}O_{3-x-0.5y-w}$ (Formula (1b));

the In-reduced compound represented by $M_{1-x}Zr_{1-y}In(II)_{2w}In(III)_{y-2w}O_{3-x-0.5y-w}$ (Formula (1c)); and the In-reduced compound represented by $M_{1-x}Zr_{1-y}In(I)_{2w-y}In(II)_{2y-2w}O_{3-x-0.5y-w}$ (Formula (1d)).

For example, when In is In(I) and In(III), the reaction formula A1 below is considered to be followed. In addition, when In is In(II) and In(III) or is In(I) and In(II), the reaction formula A2 or A3 below is considered to be followed, respectively.

[Chemical formula 24]

$$Ba_{1-x}Zr_{1-y}In_y O_{3-x-0.5y}+wH_2 \rightarrow Ba_{1-x}Zr_{1-y}In(I)_w In(III)_{y-w}O_{3-x-0.5y-w}+wH_2O \tag{A1}$$

$$Ba_{1-x}Zr_{1-y}In_y O_{3-x-0.5y}+wH_2 \rightarrow M_{1-x}Zr_{1-y}In(II)_{2w}In(III)_{y-2w}O_{3-x-0.5y-w}+wH_2O \tag{A2}$$

$$Ba_{1-x}Zr_{1-y}In_y O_{3-x-0.5y}+wH_2 \rightarrow M_{1-x}Zr_{1-y}In(I)_{2w-y}In(II)_{2y-2w}O_{3-x-0.5y-w}+wH_2O \tag{A3}$$

In contrast, it is believed that the In-reduced compound is transformed into the hydrogen-containing compound represented by the general formula (2a) when exposed to the hydrogen atmosphere at a temperature of less than 600° C., due to the introduction of the hydride ion and the oxidation of In, such as In(I). For example, when In is In(I) and In(III), it is believed that the In-reduced compound obtained by the reaction formula A1 is transformed into the hydrogen-containing compound represented by the general formula (2b) according to the reaction formula C1 when exposed to the hydrogen atmosphere at a temperature of less than 600° C., due to the introduction of the hydride ion and the oxidation of In(I) according to the reaction formula B. Furthermore, when In is In(II) and In(III) or is In(I) and In(II), the reaction formula C2 or C3 below is considered to be followed, respectively.

[Chemical formula 25]

$$H_2+In(I)_{In}" \rightarrow 2H_i'+In(III)_{In}^x \tag{B}$$

$$Ba_{1-x}Zr_{1-y}In(I)_w In(III)_{y-w}O_{3-x-0.5y-w}+0.5nH_2 \rightarrow Ba_{1-x}Zr_{1-y}In(I)_{w-0.5n}In(III)_{y-w+0.5n}O_{3-x-0.5y-w}H_n \tag{C1}$$

$$M_{1-x}Zr_{1-y}In(II)_{2w}In(III)_{y-2w}O_{3-x-0.5y-w}+0.5nH_2 \rightarrow M_{1-x}Zr_{1-y}In(II)_{2w-n}In(III)_{y-2w+n}O_{3-x-0.5y-w}H_n \tag{C2}$$

$$M_{1-x}Zr_{1-y}In(I)_{2w-y}In(II)_{2y-2w}O_{3-x-0.5y-w}+0.5nH_2 \rightarrow M_{1-x}Zr_{1-y}In(I)_{2w-y-n}In(II)_{2y-2w+n}O_{3-x-0.5y-w}H_n \tag{C3}$$

In the reaction formula B, the superscripts ['] and [x] represent relative charges of −1 and zero, respectively. In addition, $H_i$ represents a hydrogen-impurity, and $In(I)_{In}$ and $In(III)_{In}$ represent In with +1-valence and +3-valence at In lattice sites, respectively.

A formed body of the hydrogen-containing perovskite type compound into which the hydride ion is introduced, for example, a film-like body as a single body, or a composite in which the film-like body is provided on a support, can be prepared by forming the perovskite type compound represented by the general formulas (1a) to (1d) into the film-like body as the single body or the composite in which the film-like body is provided on the support, and then exposing the film-like body to the hydrogen atmosphere at a temperature of less than 600° C. in the same manner as described above to introduce the hydride ion (H⁻) into the perovskite type compound represented by the general formula (1), which is the film-like body.

<Composite Member Having Hydrogen Permeable Layer>

The present invention includes a composite member having a hydrogen permeable layer made of the hydrogen permeable material of the present invention on at least a part of a surface of a porous substrate. The porous substrate is not particularly limited, and may be any material that is resistant in an environment in which the composite member having the hydrogen permeable layer is used, and the extent of porosity may be appropriately determined depending on the application of the composite member having the hydrogen permeable layer. The porous substrate may be, for example, a porous cermet substrate, and the ceramic component is preferably the perovskite type compound represented by the general formulas (1a) to (1d) or (2a) to (2d) substantially the same as the perovskite type compound constituting the hydrogen permeable layer, in terms of avoiding contamination of the hydrogen permeable layer during the preparation of the composite member. The metal component is not particularly limited, and examples thereof include nickel and zinc.

The porous cermet substrate can be obtained by forming a mixture of particulate nickel oxide or zinc oxide and a particulate of the perovskite type compound represented by the general formula (5a) or (5b) and reducing the mixture, resulting in a porous cermet substrate composed of nickel or zinc and the perovskite type compound represented by the general formula (1).

[Chemical formula 26]

$$M_{1-x}Zr_{1-y}In_yO_{3-x-0.5y} \tag{5a}$$

$$M_{1-x}Zr_{1-y}In(III)_yO_{3-x-0.5y} \tag{5b}$$

A paste layer of the perovskite type compound represented by the general formula (5a) or (5b) is further formed on the porous cermet substrate, and the paste layer is baked to obtain a precursor of the composite having a layer of the perovskite type compound represented by the general formula (5a) or (5b) on the porous cermet substrate. The perovskite type compound in the porous cermet substrate and in the layer of the perovskite type compound is converted into the perovskite type compound represented by the general formulas (1a) to (1d) by heating the precursor at 600° C. or more in the hydrogen atmosphere in the same manner as the method for producing the perovskite type compound represented by the general formulas (1a) to (1d). Then, the perovskite type compound in the porous cermet substrate and in the layer of the perovskite type compound is converted into the hydrogen-containing perovskite type compound by exposing to the hydrogen atmosphere at a temperature of less than 600° C. to introduce the hydride ion (H⁻) into the perovskite type compound represented by the general formulas (1a) to (1d) in the porous cermet substrate and in the layer of the perovskite type compound.

The hydrogen permeable material comprising the hydrogen-containing perovskite type compound can conduct electrons and hydrogens simultaneously, thereby providing a hydrogen transport within the material. The hydrogen transport here is considered to be caused by the hydride ion contained in the hydrogen-containing perovskite type compound. The result of FIG. 11(b) shows that the hydrogen permeable material comprising the hydrogen-containing perovskite type compound is capable of conducting electrons and hydrogens simultaneously.

The hydrogen permeable material comprising the hydrate of the hydrogen-containing perovskite type compound can conduct mainly electrons and hydride ions simultaneously, thereby performing the hydrogen transport within the material. It is also believed that protons generated by hydration may contribute to the hydrogen transport.

The hydrogen permeable material comprising the hydrate of the perovskite type compound can conduct electrons and protons simultaneously, thereby performing the hydrogen transport within the material. The hydrogen transport here is believed to be due to the protons contained in the hydrate. The result of FIG. 11(a) shows that the hydrogen permeable material comprising the hydrate is capable of conducting electrons and hydrogens simultaneously.

<Fuel Cell>

The present invention includes a fuel cell having an anode layer made of the hydrogen permeable material of the present invention, an electrolyte layer, and a cathode layer in this order on at least a part of one main surface of the porous substrate. The fuel cell of the present invention is a proton ceramic fuel cell (hereinafter also referred to as PCFC), in which the anode layer is made of the hydrogen permeable material of the present invention and the electrolyte is made of proton conductive ceramics (solid). The electrolyte layer in PCFC of the present invention may be $BaZr_xCe_{1-x-z}Y_zO_3$ (x=0.1 to 0.8, z=0.1 to 0.25, x+z≤1.0) (hereinafter also referred to as BZCY), which is a protonic conductor. BZCY is known as the electrolyte for PCFC and is not particularly limited as long as it satisfies the above composition formula. The x+z is preferably in the range of <0.8.

The cathode in the fuel cell of the present invention has a function of adsorbing oxygen molecules and dissociating and ionizing them. At the cathode, a reaction between protons conducted through the electrolyte and oxygen ions ($O^{2-}$ ions) (the reduction reaction of oxygen) occurs. The material of the cathode is not particularly limited, and known materials used as the cathode of the fuel cell can be used. Examples of the material of the cathode include a metal oxide having a perovskite type crystal structure, and specific examples thereof include samarium strontium cobaltites, for example, $Sm_{0.5}Sr_{0.5}CoO_3$, lanthanum strontium cobalt ferrites, for example, $La_{1-x}Sr_xFe_{1-y}Co_yO_3$ (0<x<1, 0.1≤y≤1), barium strontium cobalt ferrites, for example, $Ba_{0.5}Sr_{0.5}Co_{0.6}Fe_{0.4}O_3$, praseodymium nickel oxides, for example, $Pr_2NiO_4$, and the like. However, it is not intended to be limited thereto. The thickness of the cathode is not particularly limited, but may be, for example, in the range of 1 to 1000 μm. However, it is not intended to be limited to this range.

The PCFC of the present invention may have an operating temperature in the range of, for example, from 400 to 600° C., and the operating temperature is preferably 450° C. or more, more preferably 500° C. or more, and still more preferably 550° C. or more.

[Method for Producing PCFC]

The PCFC of the present invention can be produced, for example, by forming the electrolyte layer and the cathode layer in this order on the hydrogen permeable layer of the composite member which has the hydrogen permeable layer made of the hydrogen permeable material of the present invention on at least a part of one main surface of the porous substrate.

EXAMPLES

Hereinafter, the present invention will be described in more detail with reference to Examples. Materials, amounts used, ratios, processing contents, processing procedures, and the like shown in the examples can be appropriately changed without departing from the spirit of the present invention. Therefore, the scope of the present invention is not limited to specific examples shown below.

Hereinafter, a conventional perovskite type compound including Ba, In and Zr is also referred to as "BZI compound". Furthermore, a perovskite type compound containing the reduced In (that is, In(I) and In(II)) is also referred to as "In-reduced BZI compound" in particular, and a perovskite type compound containing hydrogen as the hydride ion is also referred to as "hydrogen-containing BZI compound" in particular.

Example 1

1-1. Preparation of BZI Compounds

BZI compounds were prepared by the following method according to the stoichiometric compositional ratio shown in Table 1. First, samples were prepared by mixing $BaCO_3$, $In_2O_3$ and $ZrO_2$ using a ball mill so that Ba, In and Zr satisfied the desired molar ratio, and the samples were heated at 900° C. for 6 hours. The samples were then milled using the ball mill and further heated at 1300° C. for 8 hours. The samples were pulverized again using the ball mill, then the samples were molded by uniaxial pressing and isostatic pressing, and the molded bodies were heated at 1500° C. for 8 hours to obtain dense sintered bodies of BZI compounds. In addition, the dense sintered bodies prepared in the same manner as described above were pulverized in a mortar to obtain powders of BZI compounds. Hereinafter, each sample prepared according to this step will be described with a sample number shown in Table 2 depending on the types of the sintered body and powder for each composition example.

1-2. Preparation of In-Reduced BZI Compounds

In-reduced BZI compounds of this example were obtained by heating the samples prepared according to 1-1 above at between 700 and 800° C. for 5 hours or more in a dry hydrogen gas. The dew point temperature of the water vapor partial pressure of the dry gas is −78° C. or less, and the same applies to the subsequent examples. Since the preparation conditions of the In-reduced BZI compounds differ for each of measurements described later, the detailed preparation conditions will be described in the respective measurement sections.

1-3. Preparation of Hydrogen-Containing BZI Compounds

Hydrogen-containing BZI compounds of this example were obtained by heating the samples prepared according to 1-1 above at 700 to 800° C. for 5 hours or more in the dry hydrogen gas, and then exposing the samples to the dry hydrogen gas in the temperature range of less than 600° C. for a predetermined time. Since the preparation conditions of the hydrogen-containing BZI compounds differ for each of measurements described later, the detailed preparation conditions will be described in the respective measurement sections. Note that, the process as described above, in which a sample is heated in a dry hydrogen gas (or deuterium gas) at a high temperature for a predetermined time and then placed in a temperature range of a relatively low temperature in the dry hydrogen gas (or deuterium gas) for a predetermined time or more, is also referred to as a "hydrogen introduction process" in Examples.

1-4. XRD Measurement

Powder X-ray diffraction (XRD) was performed on the powder samples 11b to 18b prepared in 1-1 above. Powder XRD measurement was performed with RIGAKU ULTIMA4 diffractometer and the 2θ/θ scan rate was 10 degree/min. FIG. 1 shows XRD patterns of Samples 11b to 15b. FIG. 2 shows XRD patterns of Samples 13b, 16b to 18b. Note that FIG. 2 also shows XRD patterns of Samples 13b, 16b and 17b after the hydrogen introduction process described later. In FIG. 2, solid lines represent XRD patterns of the samples as prepared in 1-1 above (prior to the hydrogen introduction process), and broken lines represent XRD patterns of the samples after the hydrogen introduction process.

These XRD patterns demonstrate that all the samples 11b to 17b (x=0 to 0.2 and y=0.3 to 0.7) have a cubic perovskite type phase. All of these samples were milky white solids. On the other hand, when Ba loss was increased up to Sample 18b (x=0.3), $In_2O_3$ impurity phase was formed and a single phase was not obtained under the preparation condition of Sample 18b. However, if the condition is optimized, the single phase can be obtained. Although not shown, Sample

TABLE 1

| $Ba_{1-x} Zr_{1-y} In_y O_{3-x-0.5y}$ | | | | | | | | | |
|---|---|---|---|---|---|---|---|---|---|
| | Composition Examples | | | | | | | | |
| | Ex. 1 | Ex. 2 | Ex. 3 | Ex. 4 | Ex. 5 | Ex. 6 | Ex. 7 | Ex. 8 | Ex. 9 |
| X | 0 | 0 | 0 | 0 | 0 | 0.1 | 0.2 | 0.3 | 0.1 |
| Y | 0.3 | 0.4 | 0.5 | 0.6 | 0.7 | 0.5 | 0.5 | 0.5 | 0.3 |

TABLE 2

| | Composition Examples | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| Sintered body | Sample 11a | Sample 12a | Sample 13a | Sample 14a | Sample 15a | Sample 16a | Sample 17a | Sample 18a | Sample 19a |
| Powder | Sample 11b | Sample 12b | Sample 13b | Sample 14b | Sample 15b | Sample 16b | Sample 17b | Sample 18b | Sample 19b |

19*b* (x=0.1 and y=0.3) was also found to be the cubic perovskite type phase from its XRD pattern.

1-5. Measurement of Electrical Conductivity

The electrical conductivity of the sintered samples 11*a* to 17*a* obtained in 1-1 was evaluated. Both surfaces of the respective samples (diameter 10 mm and thickness 1.2 mm) were polished with SiC paper, and then Pt pastes on both surfaces were baked to prepare electrodes. The electrical conductivity was measured by an alternating current two-terminal method using that. First, the sintered samples were heated to 800° C. in humidified Ar gas, and the electrical conductivity was measured in steps of 50° C. or 100° C. while lowering the temperature at 10° C./min within the range of from 800° C. to 100° C. The partial pressure of water vapor ($p_{H2O}$) in the humidified gas was about 0.023 atm, and the same applies to the following examples. Subsequently, the temperature was raised to 800° C. in the same atmosphere, and thereafter, the atmosphere was switched to a dry hydrogen gas and heated at 800° C. for 30 hours. At this time, In in the samples is reduced from +3-valence to +1-valence, and the BZI compounds are converted into the In-reduced BZI compounds (the compound represented by the general formula (1)) although an identification method for the compounds will be explained in more detail later. After the above heating of 30 hours, the electrical conductivity was measured in steps of 50° C. or 100° C. while lowering the temperature at 10° C./min within the range of from 800° C. to 100° C. in the same atmosphere.

FIG. 3 shows a relationship between temperature and electrical conductivity for each sample. In FIG. 3, (a) Sample 11*a* (x=0 and y=0.3), (b) Sample 12*a* (x=0 and y=0.4), (c) Sample 14*a* (x=0 and y=0.6), (d) Sample 15*a* (x=0 and y=0.7), (e) Sample 13*a* (x=0 and y=0.5), (f) Sample 16*a* (x=0.1 and y=0.5), (g) Sample 17*a* (x=0.2 and y=0.5). The measurement results are shown in Arrhenius plot format. The images shown in each graph are pictures of samples before and after heat treatment in the dry hydrogen gas. After the measurement in the dry hydrogen gas atmosphere, all samples changed from milky white to black. In addition, the (e) to (g) of FIG. 3 show measurement results of the samples after the hydrogen introduction process described later.

First, according to past reports, BZI compounds in an environment containing water vapor generally incorporate water molecules as hydroxyl groups (OH) by the hydration reaction represented by the following reaction formula E to convert into hydrates $Ba_{1-x}Zr_{1-y}In_yO_{3-x-0.5y-k}(OH)_{2k}$ (k≤x+0.5y) (References 1 and 2. for references, see the following List of References).

[Chemical formula 27]

$$H_2O+V_O^{\cdot\cdot}+O_O^x \rightarrow 2(OH)_O^{\cdot} \qquad (E)$$

The reaction formula E represents the hydration reaction by an association of water molecules ($H_2O$) with lattice oxygen deficiencies ($V_O$) according to Kroger-Vink notation. Herein, the uppercase elemental symbol represents each element, "OH" represents an hydroxyl group formed by the bonding of a proton with a lattice oxygen, and the subscript elemental symbol represents a lattice site of each atom in the perovskite type crystal structure. The superscript "•" and "x" indicate relative charges of +1 and zero, respectively. Thus, the BZI hydrates are known to exhibit proton conductivity in inert atmospheres or in air containing water vapor (References 1 and 2).

Returning to FIG. 3, the electrical conductivity of the samples 11*a* to 17*a* in the humidified Ar gas showed slight differences due to differences in composition. This is because the conduction mechanism in BZI compounds in the humidified atmosphere is a proton conduction through the hydration reaction according to the reaction formula E described above (References 3 to 5). In any samples, the activation energy was about 0.5 eV, the electrical conductivity in the temperature range of 200 to 800° C. was improved with increasing temperature and the electrical conductivity at around 600° C. was about $7\times10^{-4}$ S/cm. These behaviors are also consistent with reports by past literatures (References 3 to 5).

However, in the dry hydrogen gas atmosphere, there was a significant difference in the electrical conductivity of each sample. For Samples 11*a* and 12*a* (x=0 and y=0.3, 0.4), the electrical conductivity in the dry hydrogen gas had a moderate slope at 300° C. or more, compared with the electrical conductivity in the humidified Ar gas ((a) and (b) in FIG. 3). The activation energy was calculated from these slopes, and it was about 0.54 eV in the humidified Ar gas while it was reduced to about 0.38 eV in the dry hydrogen gas. Furthermore, for Sample 12*a*, the conductivity at 500° C. or more in the dry hydrogen gas was higher than that in the humidified Ar gas.

The proton carrier in the BZI compounds is provided by the hydration reaction of the reaction formula E above. However, in the dry hydrogen gas, since sufficient proton generation by hydration does not occur, it is considered that proton-free conductivity occurs. Therefore, for Sample 11*a*, the direct current conductivity was also measured in the dry hydrogen gas in the same manner as the alternating current method. As a result, the conductivity measured by the direct current method was in agreement with the conductivity measured by the alternating current method (FIG. 3(*a*)). This indicates that an electron conduction occurs in the dry hydrogen gas.

For Sample 13*a* (x=0 and y=0.5), the electrical conductivity in the dry hydrogen gas increased by about 2 times at 800° C. and by one order of magnitude at 400° C. compared to the electrical conductivity in the humidified Ar gas (FIG. 3(*e*)). Furthermore, the electrical conductivity of the sample in the temperature range of 400° C. or less was almost constant. This result may be due to that the sample after heat treatment in dry hydrogen gas has an electrical conduction mechanism other than the previously reported proton conductivity, i.e., an electron conductivity.

For Samples 14*a* and 15*a* (x=0 and y=0.6, 0.7), the samples collapsed during the heat treatment at 800° C., it was difficult to measure. XRD measurements (not shown) on the collapsed samples were performed, and metallic In was detected. Therefore, the BZI compounds of Samples 14*a* and 15*a* appeared to decomposed because of the reduction of some In and the precipitation of metallic In by the heat treatment at 800° C. in the dry hydrogen gas. Then, for Samples 14*a* and 15*a*, the electrical conductivity was measured again after heat treatment at 700° C. for 30 hours in the dry hydrogen gas ((c) and (d) in FIG. 3). The electrical conductivity in the dry hydrogen gas of both samples increased compared with the electrical conductivity in the humidified Ar gas, but the values were smaller than the value of Sample 13*a*.

For Samples 16*a* and 17*a* (x=0.1, 0.2, and y=0.5), in which the A-site cation Ba of the perovskite type structure was lost, the electrical conductivity was greatly improved by the heat treatment in the dry hydrogen gas ((f) and (g) in FIG. 3). That is, Samples 16*a* and 17*a* exhibited the electrical conductivity almost equivalent to Sample 13*a* when measured in the humidified Ar gas, but higher than Sample 13*a* when measured in the dry hydrogen gas. For Samples 16a and 17a, the electrical conductivity was $10^{-2}$ S/cm or more and was almost constant in the temperature range of approximately 100° C. or more. For Sample 17a, the direct current conductivity was also measured in the dry hydrogen gas in the same manner as the alternating current method. As a result, the conductivity measured by the direct current method was in agreement with the conductivity measured by the alternating current method (FIG. 3(g)). This indicates that the relatively high conductivity in the dry hydrogen gas is mainly due to the electron conduction.

In addition, for Samples 13a, 16a and 17a, the electrical conductivity of the samples held at a relatively low treatment temperature was also measured after the electrical conductivity of the In-reduced BZI compounds was measured. Specifically, after the electrical conductivity measurement of the In-reduced BZI compounds described above was completed, the heating at 300° C. for 12 hours without changing the atmosphere was performed and then the electrical conductivity was measured while raising the temperature from 100° C. to 800° C. at 10° C./min. The samples at this time correspond to the hydrogen-containing BZI compounds (the compound represented by the general formulas (2a) to (2d)). The electrical conductivity obtained by this measurement was lower than that of the In-reduced BZI compounds ((e) to (g) in FIG. 3).

That is, the (e) to (g) in FIG. 3 demonstrate that the electrical conductivity of the In-reduced BZI compounds in the temperature range of 100 to 800° C. is maintained higher, while the electrical conductivity of the hydrogen-containing BZI compounds is lower than that. As described below with respect to FIG. 6, the introduction of hydrogen occurs when the In-reduced BZI compounds are heated at 300° C. in the dry hydrogen gas. Therefore, it is considered that: hydrogen-dopants trapped a part of electrons in In-reduced BZI compounds by the reaction shown in the following the reaction formula F to generate hydride ions, and consequently, the concentration of the conductive electrons decreased and the conductivity decreased.

[Chemical formula 28]

$$H_2 + 2e' \rightarrow 2H_i' \qquad\qquad (F)$$

The reaction formula F is expressed in Kroger-Vink notation, and the e' and $H_i'$ represent a conductive electron and a hydride ion at the interstitial site, respectively.

For also Sample 19a, although an improvement was not observed as much as for Sample 17a, the electrical conductivity in the dry hydrogen gas was improved compared to the electrical conductivity in the humidified Ar gas (not shown).

The above results demonstrate that the BZI compounds exhibit low electrical conductivity of about $10^{-4}$ S/cm in the humidified Ar gas due to the proton conductivity but exhibit high electrical conductivity when heated in the dry hydrogen gas to be blackened. Furthermore, the samples with Ba loss of about x≤0.2 exhibited larger electrical conductivity than the samples without Ba loss and exhibited the electrical conductivity of $10^{-2}$ S/cm or more in the temperature range of 300° C. or more (in particular, 400° C. or more). On the other hand, a conductive electron concentration in the BZI compounds decreased and the electrical conductivity decreased due to the exposure to hydrogen gas at the relatively low temperature after heating at the high temperature (the hydrogen introduction process).

Hereinafter, the samples of Composition Examples 3, 6 and 7, which exhibit very high electron conductivity when heated in the dry hydrogen gas, will be described in more detail.

1-6. TG Measurement

Thermogravimetry (TG) measurement was performed on the powder samples 13b, 16b and 17b prepared in 1-1 above. The measurement was performed using Netzsch STA2500 thermogravimeter, and the heating rate was set at 2° C./min. The measurement was performed with three atmospheres: (1) humidified Ar gas; (2) dry Ar gas; and (3) dry hydrogen gas.

FIG. 4 shows thermogravimetric curves of BZI compound samples. In FIG. 4, (a) Sample 13b (x=0 and y=0.5), (b) Sample 16b (x=0.1 and y=0.5), and (c) Sample 17b (x=0.2 and y=0.5). FIG. 4(d) shows weight changes at 700° C. of the samples when the atmosphere was switched from the dry Ar gas to the dry hydrogen gas.

In the humidified Ar gas, the hydration reaction according to the reaction formula E above occurred at around 300° C., the weights of the samples were increased, but when the temperature further increased, the water gradually lost at about 400° C. or more, and the weights of the samples became almost constant at 500° C. or more. From this, it was confirmed that the hydrates of the BZI compounds can be obtained by the heat treatment at about 300° C. in the humidified atmosphere, and that the hydrates gradually lose water and change to non-hydrated phase by the heat treatment at about 400° C. or more.

Since no hydration reaction occurs in the dry Ar gas, it seems that a dehydration reaction occurs at around 250° C., and the non-hydrated phase with the composition $Ba_{1-x}Zr_{0.5}In0.5O_{2.75-x}$ is formed at 400° C. or more. The weights of the samples in the dry hydrogen gas were greatly reduced at 450° C. or more for Sample 13b and at 400° C. or more for Samples 16b and 17b, and plateaus appeared at about 700° C. or more for any samples. This indicates that: when the BZI compounds are heated in the dry hydrogen gas, the lattice oxygens are lost due to reduction, and the BZI compounds change to a new phase.

When the atmosphere was switched from the dry Ar gas to the dry hydrogen gas, an obvious weight loss was observed (FIG. 4(d)). The weight loss of the samples was 1.59 wt % (Sample 13b), 2.40 wt % (Sample 16b) and 2.85 wt % (Sample 17b), respectively. It is considered that most of the water (or OH groups) in the BZI compounds is lost at 700° C. in the dry Ar gas and that the non-hydrated phase having the composition $Ba_{1-x}Zr_{0.5}In_{0.5}O_{2.75-x}$ is formed. Thus, it is believed that the weight loss in the dry hydrogen gas is all due to lattice oxygen loss, resulting in the reduction of In for the charge balance.

1-7. XAFS Measurement

The X-ray absorption fine structure (XAFS) analysis was performed on the powder samples 13b and 17b prepared in 1-1 above. The XAFS measurement was performed at SPring-8 BL01. More specifically, XAFS spectrum was measured by a transmission method using pellet samples. The pellet samples were obtained by mixing the powder samples of the BZI compounds with a BN powder as a diluent at an appropriate weight ratio, and uniaxially molding the mixture into the shape with 10 mm of diameter and 1 mm of thickness. Three types of measurements were performed on each of the samples 13b and 17b; (1) a sample as prepared according to 1-1 above, (2) a sample after heating at 800° C. for 5 hours in dry hydrogen gas, changing the atmosphere to dry Ar gas, and quenching the sample to room temperature at 50° C./min, and (3) a sample after heating at 800° C. for 5 hours in dry hydrogen gas, and relatively slowly cooling the sample to room temperature at 3° C./min without changing the atmosphere. Wherein, the sample (2) quenched in the dry Ar gas corresponds to the In-reduced BZI compound, and the sample (3) cooled relatively slowly in the dry hydrogen gas corresponds to the hydrogen-containing BZI compound.

FIG. 5 shows In—K edge XAFS spectrums of samples. In FIG. 5, (a) Sample 13*b* (x=0 and y=0.5), (b) Sample 17*b* (x=0.2 and y=0.5). FIG. 5 also shows XAFS spectrum of the reference-material In metallic foil. The absorption edge of the In metallic foil was 27942.7 eV.

The as-prepared samples 13*b* and 17*b* both exhibited the absorption edge of about 27945.3 eV, which was clearly in a higher energy side than the In metallic foil. These values are in good agreement with a reported value for oxides containing In(III) (Reference 6).

For Samples 13*b* and 17*b* quenched in the Ar gas, the absorption edges clearly shifted to a lower energy side. The absorption edges of the samples quenched in the Ar gas were 27944.2 eV (Sample 13*b*) and 27944.4 eV (Sample 17*b*), respectively. In general, it is known that the absorption edge of a transition metal oxide shifts to the lower energy side when its average valence decreases (References 7 and 8). Therefore, it is found that the valence of some In in both Samples 13*b* and 17*b* was reduced from +3-valence to +1-valence or +2-valence by the heat treatment in the dry hydrogen gas. This result is also consistent with the above-described TG behavior (FIG. 4(*d*)), in which the heat treatment in the dry hydrogen gas results in the weight loss due to the lattice oxygen loss, resulting in In reduction.

On the other hand, the absorption edges of the samples cooled in the dry hydrogen gas were higher than those of the samples quenched in the dry Ar gas. This indicates that the samples absorb hydrogen from the atmosphere as the temperature decreases and consequently the valence of In, which was lowered by the heat treatment in the dry hydrogen gas, is increased during the cool down.

As described above, the measurement results of TG and XAFS indicated that the reduction of In occurred due to the oxygen loss caused by the heat treatment in the dry hydrogen gas. Furthermore, considering the results of the electric conductivity, it is found that the BZI compounds were reduced in dry hydrogen gas with high temperature to be blackened and converted to the In-reduced BZI compounds with higher electric conductivity. This higher conductivity may be contributed by $5p^2$ electron pair on In(I) and $5p$ unpaired electron on In(II), which are caused by the reduction of In(III). Given that the conductive electron (e') is $5p$ electron on In(I) and In(II), the hydrogen incorporation reaction according to the above reaction formula F can be replaced by an oxidation reaction of In, such as the oxidation of In(I), represented by the above reaction formula B. Accordingly, it is found that: when the In-reduced BZI compounds were exposed to hydrogen gas at a relatively low processing temperature, hydrogen uptake occurs according to the above reaction formula B, for example, and as a result, at least some of In is oxidized, such as In(I) being oxidized to In(III), and the hydride ion ($H^-$) is generated.

1-8. NMR Measurement $^1$H-nuclear magnetic resonance ($^1$H-NMR) was performed on the powder samples 13*b* and 17*b* prepared in 1-1 above. The measurement was performed by the magic angle spinning (MAS) method using Jeol JNM-ECAII, and the resonance frequency was set to 600 MHz. Two types of measurements were performed on each sample; (1) in a state as prepared according to 1-1 above, and (2) in a state after heating the sample as prepared according to 1-1 above at 800° C. for 5 hours in a dry hydrogen gas, and then subjecting the sample to the hydrogen introduction process to cool relatively slowly to room temperature at 3° C./min without changing the atmosphere. The samples subjected to the hydrogen introduction process correspond to the hydrogen-containing BZI compounds (the compound represented by the general formulas (2a) to (2d)).

FIG. 6 shows NMR measurement data of the samples. FIG. 6(*a*) shows the measurement result of Sample 13*b*, and FIG. 6(*b*) shows the measurement result of Sample 17*b*. In the figure, dotted lines indicate measurement data of the sample as prepared, and solid lines indicate measurement data of the sample after the hydrogen introduction process. Both the as-prepared samples exhibited a broad peak near 7 ppm, which was in good agreement with the peak of proton from the surface-adsorbed water (Reference 10). On the other hand, the slowly cooled samples after heating in the dry hydrogen gas exhibited a sharp peak at 4.8 ppm, which was in agreement with the characteristics of the hydride ion in the perovskite lattice (Reference 11).

The above results of the conductivity measurement, XAFS measurement, and NMR measurement demonstrate that hydrogens is introduced into the In-reduced BZI compounds to produce hydride ions by exposing the In-reduced BZI compounds to the hydrogen gas at a relatively low process temperature (the hydrogen introduction process).

Then, the metal-oxygen stoichiometric composition can be estimated from the result of TG measurement shown in FIG. 4, and the average valence of In in samples can be calculated based on the stoichiometric composition.

As described above with respect to FIG. 4(*d*), it can be inferred that the water (or OH group) in the BZI compounds is almost lost in the dry Ar gas at 700° C., and the non-hydrated phase is formed. Therefore, in FIG. 4(*d*), it is assumed that the weight loss when the samples were exposed to the dry hydrogen gas at 700° C. is all caused by lattice oxygen loss due to In reduction, and that no hydrogen is occluded at the same temperature. In this case, Sample 13*b* (M=284.3) is estimated to change to $BaZr_{0.5}In_{0.5}O_{2.47}$ based on the weight loss (1.59 wt %) due to the oxygen loss. This compound $BaZr_{0.5}In_{0.5}O_{2.47}$ corresponds to the compound represented by the general formula (1a) with x=0, y=0.5 and w=0.28. In addition, Sample 16*b* (M=269.0) and Sample 17*b* (M=253.7) are estimated to change to $Ba_{0.9}Zr_{0.5}In_{0.5}O_{2.25}$ and $Ba_{0.8}Zr_{0.5}In_{0.5}O_{2.10}$, based on the weight loss due to the oxygen loss (2.40 wt % and 2.85 wt %), respectively. The former compound $Ba_{0.9}Zr_{0.5}In_{0.5}O_{2.25}$ corresponds to the compound represented by the general formula (1a) with x=0.1, y=0.5 and w=0.4, and the latter compound $Ba_{0.8}Zr_{0.5}In_{0.5}O_{2.10}$ corresponds to the compound represented by the general formula (1a) with x=0.2, y=0.5 and w=0.45.

The stoichiometric composition shall be derived by the following method. In TG measurement shown FIG. 4(*d*), it is assumed that the weight loss when the samples are exposed to the dry hydrogen gas at 700° C. is all caused by lattice oxygen loss due to In reduction, and that no hydrogen is occluded at the same temperature. TG measurement shown in FIG. 4(*d*) demonstrates that the weights of samples are almost stable and the samples change to a stable phase having a particular composition when heated at 700° C. for 3 hours or more in the dry hydrogen gas. When a weight of sample used for TG measurement is represent by m(g) and a weight loss obtained from the TG measurement shown in FIG. 4(*d*) is represent by Δm(g), the molar fraction w of lattice oxygen lost due to the weight loss is given by the following formula P.

[Mathematical formula 3]

$$w = (\Delta m/16) \div (m/M) = (\alpha \times M)/16 \quad (P)$$

Wherein $\alpha$ is a ratio of the weight loss to the weight of the sample used ($\Delta m/m$). For example, the compositions of Samples 13b, 16b and 17b (y=0.5) after TG measurement are given by $Ba_{1-x}Zr_{0.5}In_{0.5}O_{2.75-x-w}$ as described above.

The average valence of In is determined by the following formula D' in terms of the charge balance of the whole composition.

[Mathematical formula 4]

$$\text{Average valence of In} =$$
$$-\big[\Sigma\ (\text{valence of } A\text{-site atom}\times\text{ratio}) + \Sigma$$
$$(\text{valence of } B\text{-site atom excluding In}\times\text{ratio}) +$$
$$(-2)\times\text{ratio of oxygen}+(+1)\times\text{ratio of H}^{+} +$$
$$(-1)\times\text{ratio of H}^{-}\big]/\text{ratio of In}\ (D')$$

In formula D', the symbol $\Sigma$ represents that if there are more than one A-site atoms in the perovskite structure, the sum is taken for those atoms, and if there are more than one B-site atoms excluding In, the sum is taken for those atoms. Furthermore, the term "$(+1)\times$ratio of H$^{+}$" indicates that an influence of the charge of the hydrogen ions with the valence of +1, if present, is taken into account, and the term "$(-1)\times$ratio of H$^{-}$" indicates that an influence of the charge of the hydride ion with the valence of $-1$, if present, is taken into account. However, the ratio of H$^{+}$ in the In-reduced BZI compounds and the hydrogen-containing BZI compounds can be said to be almost zero since the samples which was prepared by the method described in 1-1 above and which was subjected to the hydrogen introduction process contained almost no proton based on a result of a neutron diffraction (FIG. 8, Tables 6 and 7) described later. Using the valence of Ba, Zr, and O as +2, +4, and $-2$, respectively, for example, the average valence of In in Composition Example 3 is about 1.88 by calculating $-(2\times1+4\times0.5+(-2)\times2.47)/0.5$ based on the stoichiometric composition.

The stoichiometric compositions and the average valences of In of Samples 13b, 16b and 17b derived from the result of TG measurement were as shown in Table 3. In Table 3, a weight increasing due to the introduction of the hydrogen species by the heat treatment in hydrogen at 700° C. and an effect on the charge compensation were ignored. That is, the terms "$(+1)\times$ratio of H$^{+}$" and "$(-1)\times$ratio of H$^{-}$" in the above formula D' were set to 0. The reason is that, the samples quenched to room temperature after the heat treatment in the dry hydrogen gas at 700° C. (non-hydrogen introduction Samples 23e and 27e) contain only about 0.01 formula amount of the hydrogen, as shown in SIMS measurement (FIG. 7) described later, so that it hardly contributes to the entire charge compensation. In addition, the atomic weight (1) of hydrogen is much smaller than those of other constituent elements, and the weight increase due to the introduction of H with the formula amount of about 0.01 can be ignored.

The ratios of In(I), In(II) and In(III) in In were determined on the basis of the average valence of In obtained by the formula D' when In is assumed to be In(I) and In(III) (the general formula (1b)) and when In is assumed to be In(II) and In(III) or In (I) and In(II) (the general formulas (1c) or (1d)), respectively. As shown in Table 3, it is found that the reduction of In occurs by the heat treatment of the BZI compounds in the hydrogen atmosphere, resulting in the In-reduced BZI compounds (the compound represented by the general formula (1b), (1c) or (1d)).

TABLE 3

| | Weight change [wt %] | Oxygen loss w | Average valence of In | | Composition |
|---|---|---|---|---|---|
| Comp. Ex. 3 | 1.59 | 0.283 | +1.88 | Formula 1b | $BaZr_{0.5}In(I)_{0.28}In(III)_{0.22}O_{2.47}$ (x = 0, y = 0.5, w = 0.28) |
| | | | | Formula 1d | $BaZr_{0.5}In(I)_{0.06}In(III)_{0.44}O_{2.47}$ (x = 0, y = 0.5, w = 0.28) |
| Comp. Ex. 6 | 2.40 | 0.404 | +1.40 | Formula 1b | $Ba_{0.9}Zr_{0.5}In(I)_{0.4}In(III)_{0.01}O_{2.25}$ (x = 0.1, y = 0.5, w = 0.4) |
| | | | | Formula 1d | $Ba_{0.9}Zr_{0.5}In(I)_{0.3}In(III)_{0.02}O_{2.25}$ (x = 0.1, y = 0.5, w = 0.4) |
| Comp. Ex. 7 | 2.85 | 0.452 | +1.20 | Formula 1b | $Ba_{0.8}Zr_{0.5}In(I)_{0.45}In(III)_{0.05}O_{2.10}$ (x = 0.2, y = 0.5, w = 0.45) |
| | | | | Formula 1d | $Ba_{0.8}Zr_{0.5}In(I)_{0.40}In(III)_{0.10}O_{2.10}$ (x = 0.2, y = 0.5, w = 0.45) |

Example 2

2-1. Preparation of Hydrogen-Containing BZI Compounds

The powders and sintered bodies of the hydrogen-containing BZI compounds of Composition Examples 3, 6, and 7 were prepared. The powders of the hydrogen-containing BZI compounds were obtained by heating the powders of the BZI compounds prepared according to 1-1 above at 700° C. for 24 hours in the dry hydrogen gas, then lowering the temperature to 300° C. at 10° C./min without changing the atmosphere, holding for 12 hours, and finally cooling the powders to room temperature at 10° C./min (the hydrogen introduction process). On the other hand, a process for producing the sintered bodies of the hydrogen-containing BZI compounds is as follows. First, 0.8 wt % of NiO as a sintering aid was added to the powders of the BZI compounds prepared according to 1-1 above, they were molded by uniaxial pressing and hydrostatic pressing. The molded bodies were heated at 1500° C. for 8 hours to obtain dense sintered bodies composed of the NiO-added BZI compounds. Then, the following hydrogen introduction process was performed on the dense sintered bodies. That is, the dense sintered bodies were heated in the dry hydrogen gas at 800° C. for 30 hours to obtain sintered bodies of the In-reduced BZI compounds. The In-reduced BZI compounds were further cooled to 300° C. in the same atmosphere at 10° C./min, held for 12 hours, and finally cooled to room temperature at 10° C./min.

In addition to the above samples, D-substituted samples of Composition Examples 3 and 7 were prepared using a deuterium gas (D2) instead of the hydrogen gas in the atmosphere. The powders of the hydrogen-containing BZI compounds (D-substituted bodies) were obtained by heating the powders of the BZI compounds prepared according to 1-1 above at 800° C. for 5 hours in the dry deuterium gas, and then cooling to room temperature at 3° C./min without changing the atmosphere (the hydrogen introduction process). On the other hand, a process for producing sintered bodies of the hydrogen-containing BZI compounds (D-substituted bodies) is as follows. First, 0.8 wt % of NiO as a sintering aid was added to the powders of the BZI compounds prepared according to 1-1 above, they were molded by uniaxial pressing and hydrostatic pressing. The molded bodies were heated at 1500° C. for 8 hours to obtain dense sintered bodies composed of the NiO-added BZI compounds. Then, the following hydrogen introduction process was performed on the dense sintered bodies. That is, the dense sintered bodyies were heated in the dry hydrogen gas at 800° C. for 30 hours to obtain sintered bodies of In-reduced BZI compounds. The In-reduced BZI compounds were further cooled to 300° C. in the same atmosphere at 10° C./min, held for 12 hours, and finally cooled to room temperature at 10° C./min.

Furthermore, sintered bodies of the In-reduced BZI compounds of Composition Examples 3 and 7 were prepared in the following manner. First, the dense sintered bodies composed of the NiO-added BZI compounds were obtained in the same manner as described above. The sintered bodies were heated at 800° C. in the dry hydrogen gas for 30 hours, and then quenched to room temperature at 50° C./min to obtain the sintered bodies of the In-reduced BZI compounds.

Hereinafter, each sample prepared according to this step will be described with a sample number shown in Table 4 depending on the types of the composition example, sintered body and powder, and D-substituted body.

TABLE 4

|  | Comp. Ex. 3 | Comp. Ex. 6 | Comp. Ex. 7 |
|---|---|---|---|
| X | 0 | 0.1 | 0.2 |
| Y | 0.5 | 0.5 | 0.5 |
| Hydrogen-containing BZI (sintered body) | Sample 23a | Sample 26a | Sample 27a |
| Hydrogen-containing BZI (powder) | Sample 23b | Sample 26b | Sample 27b |
| Hydrogen-containing BZI (sintered body, D-substituted) | Sample 23c |  | Sample 27c |
| Hydrogen-containing BZI (powder, D-substituted) | Sample 23d |  | Sample 27d |
| In-reduced BZI (sintered body, D-substituted) | Sample 23e |  | Sample 27e |

2-2. SIMS Measurement

The D-substituted sintered samples 23c, 23e, 27c and 27e prepared in 1-1 and 2-1 above were measured by secondary ion-mass spectrometry (SIMS). The measurement was performed using JEOL JMS-S3000, and the elemental analysis was performed from the surface to a depth of 3 μm while sputtering with a $Ga^+$ ion beam.

FIG. 7 shows SIMS profiles of samples. In FIG. 7, (a) Sample 23c (the hydrogen-containing BZI compound, x=0 and y=0.5), (b) Sample 23e (the In-reduced BZI compound), (c) Sample 27c (the hydrogen-containing BZI compound, x=0.2 and y=0.5), and (d) Sample 27e (the In-reduced BZI compound). In addition, the concentration profiles of Ba, Zr, In and O are expressed by intensities corrected by the sensitivity factors of the respective atoms, and the concentration profile of deuterium atom is expressed by the concentration determined based on the reference sample represented by $BaZr_{0.8}Y_{0.2}O_{2.9-k}(OD)_{2k}$ (k=0.1). These SIMS profiles demonstrate that the molar ratios of Ba, In and Zr charged in 1-1 above were almost maintained even in the samples after the heat treatment.

As to any samples, the concentration profiles of Ba, Zr, O and In are generally flat in the bulk deeper than the surface layer up to about 3 μm deep, and as to any samples, the strengths of In and Zr are equal to each other, which are about ½ of Ba strength, consistent with the stoichiometry of metallic elements.

The D-concentration in Sample 23c (the hydrogen-containing BZI compound) (FIG. 7(a)) is about $2.0\times10^{21}$ atom·cm$^{-3}$ in the bulk deeper than the surface-depth 500 nm, corresponding to the hydrogen content where the formula amount n is 0.15. On the other hand, the D-concentration in Sample 23e (the In-reduced BZI compound (FIG. 7(b)) is about $1.3\times10^{20}$ atom·cm$^{-3}$, and it can be seen that the D-concentration was smaller by one order of magnitude when only the heat treatment to reduce In was performed. Therefore, it is found that the hydrogen atoms are introduced into the In-reduced BZI compounds by the hydrogen introduction process.

Sample 23c is assumed to have a stoichiometric composition of $BaZr_{0.5}In_{0.5}O_{2.47}H_{0.15}$, given the estimated metal-oxygen composition based on TG measurements and the D-concentration of the sample obtained by SIMS measurements (detailed derivation methods are described below). Wherein, the values in Table 3 were used as the composition ratio of oxygen after the hydrogen introduction process. This compound $BaZr_{0.5}In0.5O_{2.47}H_{0.15}$ corresponds to the compound represented by the general formula (2a) with x=0, y=0.5, w=0.28 and n=0.15. In TG measurement, it has been confirmed that the weight loss of oxygen under the condition of 800° C. does not differ from the weight loss of oxygen under the condition of 700° C. From the stoichiometric composition above, the average valence of In of this sample 23c is about +2.18 based on the formula D'. Assuming that In is In(I) and In(III), the ratio of In(I) is 0.205. On the other hand, Sample 23e is assumed to have a stoichiometric composition of $BaZr0.5In_{0.5}O_{2.47}H_{0.010}$. This compound $BaZr_{0.5}In_{0.5}O_{2.47}H_{0.010}$ corresponds to the compound represented by the general formula (2a) with x=0, y=0.5, w=0.28 and n=0.010. The average valence of In of this sample 23e is about +1.90 based on the formula D'. This value is in agreement with the values in Table 3, and it can be seen that the average valence of In is hardly affected by the hydrogen-concentration of about 0.01. The ratio of In(I) in Sample 23e is 0.275.

Furthermore, the D-concentration in Sample 27c (the hydrogen-containing BZI compound) (FIG. 7(c)) is about $9.2\times10^{21}$ atom·cm$^{-3}$ in the bulk deeper than the surface-depth 1000 nm, corresponding to the hydrogen content where the formula amount n is 0.68. On the other hand, the D-concentration in Sample 27e (the In-reduced BZI compound (FIG. 7(d)) is about $8.1\times10^{20}$ atom·cm$^{-3}$, and it can be seen that the D-concentration was smaller by one order of magnitude when only the heat treatment to reduce In was performed, like in Composition Example 3.

Sample 27c is assumed to have a stoichiometric composition of $Ba_{0.8}Zr_{0.5}In_{0.5}O_{2.10}H_{0.68}$, given the estimated metal-oxygen composition based on TG measurements and the D-concentration of the sample obtained by SIMS measurements. This compound $Ba_{0.8}Zr_{0.5}In_{0.5}O_{2.10}H_{0.68}$ corresponds to the compound represented by the general formula (2a) with x=0.2, y=0.5, w=0.45 and n=0.68. From the stoichiometric composition above, the average valence of In of this sample 27c is about +2.56 based on the formula D'.

Assuming that In is In(I) and In(III), the ratio of In(I) is 0.110. On the other hand, Sample 27e is assumed to have a stoichiometric composition of $Ba_{0.8}Zr_{0.5}In_{0.5}O_{2.10}H_{0.060}$. This compound $Ba_{0.8}Zr_{0.5}In_{0.5}O_{2.10}H_{0.060}$ corresponds to the compound represented by the general formula (2a) with x=0.2, y=0.5, w=0.45 and n=0.060. The average valence of In of this sample 27e is about +1.32 based on the formula D'. Assuming that In is In(I) and In(III), the ratio of In(I) is 0.420.

The stoichiometric compositions based on TG and SIMS measurements shall be derived by the following method. The lattice constant of Sample 23c was determined to be 4.199 Å from XRD measurement. Therefore, the volume of the cubic perovskite unit cell of Sample 23c is $(4.199 Å)^3 = 7.403 \times 10^{-23}$ $cm^3$. Since there is one perovskite type unit in the unit cell, the density of Sample 23c is $1/(7.403 \times 10^{-23}) = 1.35 \times 10^{22}$ $unit/cm^{-3}$. Thus, the formula amount n of the hydrogen is given by the following formula, using the D-concentration measured by SIMS.

[Mathematical formula 5]

$$n = 2.0 \times 10^{21}/(1.35 \times 10^{22}) = 0.15$$

The lattice constant of Sample 23e was confirmed to be almost the same as that of Sample 23c, and its composition can be determined in the same manner as described above. In addition, the lattice constants of Samples 27c and 27e were 4.197 Å from XRD measurement. Their compositions can be determined by the same manner as described above.

Assuming that the D-concentration of each sample obtained from SIMS measurement corresponds to H-concentration after the hydrogen introduction process in the dry hydrogen gas ($H_2$), net stoichiometric compositions of the samples when the hydrogen introduction process was performed in the dry hydrogen gas are estimated as shown in Table 5. The stoichiometric compositions are shown for the case where In is In(I) and In(III) (the general formula (1b)) and for the case where In is In(II) and In(III) or In(I) and In(II) (the general formula (1c) or (1d)), respectively.

TABLE 5

| Sample | Processing | Hydrogen introduction process |
|---|---|---|
| 23c | H concentration | 0.15 |
| x = 0 | Average valence of In | +2.18 |
| y = 0.5 | Ratio w of In(I) | 0.205 |
| | Composition according to Formula 2b | $BaZr_{0.5}In(I)_{0.205}In(III)_{0.295}O_{2.47}H_{0.15}$ (x = 0, y = 0.5, w = 0.28, n = 0.15) |
| | n/(w-0.5n) in Formula 2b | 0.73 |
| | Composition according to Formula 2c | $BaZr_{0.5}In(I)_{0.41}In(III)_{0.09}O_{2.47}H_{0.15}$ (x = 0, y = 0.5, w = 0.28, n = 0.15) |
| Sample | Processing | Only In reduction |
| 23e | H concentration | 0.01 |
| x = 0 | Average valence of In | +1.90 |
| y = 0.5 | Ratio w of In(I) | 0.275 |
| | Composition according to Formula 2b | $BaZr_{0.5}In(I)_{0.275}In(III)_{0.225}O_{2.47}H_{0.01}$ (x = 0, y = 0.5, w = 0.28, n = 0.01) |
| | n/(w-0.5n) in Formula 2b | 0.036 |
| | Composition according to Formula 2c | $BaZr_{0.5}In(I)_{0.05}In(III)_{0.45}O_{2.47}H_{0.01}$ (x = 0, y = 0.5, w = 0.28, n = 0.01) |
| Sample | Processing | Hydrogen introduction process |
| 27c | H concentration | 0.68 |
| x = 0.2 | Average valence of In | +2.56 |
| y = 0.5 | Ratio w of In(I) | 0.11 |
| | Composition according to Formula 2b | $Ba_{0.8}Zr_{0.5}In(I)_{0.11}In(III)_{0.39}O_{2.10}H_{0.68}$ (x = 0.2, y = 0.5, w = 0.45, n = 0.68) |
| | n/(w-0.5n) in Formula 2b | 6.2 |
| | Composition according to Formula 2c | $Ba_{0.8}Zr_{0.5}In(I)_{0.22}In(III)_{0.28}O_{2.10}H_{0.68}$ (x = 0.2, y = 0.5, w = 0.45, n = 0.68) |
| Sample | Processing | Only In reduction |

TABLE 5-continued

| 27e | H concentration | 0.06 |
|---|---|---|
| x = 0.2 | Average valence of In | +1.32 |
| y = 0.5 | Ratio w of In(I) | 0.42 |
| | Composition according to Formula 2b | $Ba_{0.8}Zr_{0.5}In(I)_{0.24}In(III)_{0.08}O_{2.10}H_{0.06}$ (x = 0.2, y = 0.5, w = 0.45, n = 0.06) |
| | n/(w-0.5n) in Formula 2b | 0.14 |
| | Composition according to Formula 2c | $Ba_{0.8}Zr_{0.5}In(I)_{0.34}In(III)_{0.16}O_{2.10}H_{0.06}$ (x = 0.2, y = 0.5, w = 0.45, n = 0.06) |

2-3. XRD and NRD Measurement

Samples 13b, 16b and 17b prepared according to 1-1 above (before the hydrogen introduction process) and Samples 23b, 26b and 27b prepared according to 2-1 above (after the hydrogen introduction process) were measured by XRD. In addition, Samples 13b and 17b prepared according to 1-1 above (before the hydrogen introduction process) and Samples 23d and 27d prepared according to 2-1 above (after the hydrogen introduction process) were measured by Time of Fright method of neutron ray diffraction (NRD). NRD measurement was performed using Spica of JASRI. The Z-Rietveld program was used for the Rietveld analysis of NRD pattern.

FIG. 2 shows XRD patterns before and after the hydrogen introduction process of the respective samples. In FIG. 2, solid lines indicate XRD patterns of BZI compounds before the hydrogen introduction process, and broken lines indicate XRD patterns of hydrogen-containing BZI compounds after the hydrogen introduction process. Sample 23b, 26b and 27b (x≤0.2) were blackened after the hydrogen introduction process and maintained single phase of the cubic perovskite type. Given the lattice constants determined based on XRD patterns, the perovskite cubic lattice constants were confirmed to decrease about 0.5% due to the hydrogen introduction process.

FIG. 8 shows NRD patterns and Rietveld calculate profiles of the respective samples. In FIG. 8, (a) Sample 13b (before the hydrogen introduction process, x=0 and y=0.5), (b) Sample 23d (after the hydrogen introduction process), (c) Sample 17b (before the hydrogen introduction process, x=0.2 and y=0.5), and (d) Sample 27d (after the hydrogen introduction process).

As described above, BZI compounds which is as prepared in the non-hydrated atmosphere and BZI compounds formed in the room temperature humidified atmosphere, such as room temperature humidified air (water vapor partial pressure 0.023 atm), are hardly hydrated, and it has been reported that k is less than 0.01 (k<0.01) in the composition formula $Ba_1Zr_{1-y}In_yO_{3-0.5y-k}(OH)_{2k}$ (References 1 and 2). Then it can be approximated as k=0 for the composition. Rietveld analysis of NRD pattern was performed, assuming that k=0 for the as-prepared BZI compound samples and that the structure of the BZI compounds are a cubic perovskite (Pm–3m). As a result, the observed patterns and the calculated patterns were in good agreement with each other, and therefore the identification and composition of the structure were determined under the assumption above.

FIG. 9A is a conceptual diagram showing positions of hydrogen atoms in the BZI compound having the perovskite type structure. In FIG. 9A, (a) $H_t(D_t)$ represents a hydrogen atom (deuterium atom) at a position near the lattice oxygen, (b) $H_{fcc}(D_{fcc})$ represents a hydrogen atom (deuterium atom) at face center position in the perovskite structure, and (c) $H_O(D_O)$ represents a hydrogen atom (deuterium atom) at an oxygen site position.

Generally, when protons are introduced into a perovskite according to the hydration reaction of the reaction formula E above, the protons make hydrogen-bonding with the lattice oxygens and occupy positions in the vicinity within about 1 Å from the lattice oxygens (FIG. 9A(a)). Past reports (References 1 and 2) have reported that the positions of the hydrogen atoms in BZI compounds before the hydrogen introduction process are also at the same site. The hydrogen in this position (deuterium) is $H_i(D_i)$.

The calculated patterns for the samples after the hydrogen introduction process were not in good agreement with the observed patterns by an analysis in which the hydrogen atomic positions were set as only $H_i$ shown in FIG. 9A(a). However, when $H_{fcc}$ in the face center positions shown in FIG. 9A(b) was added as the hydrogen atom positions, the calculated patterns were in good agreement with the observed patterns. Furthermore, the addition of $H_O$ at the oxygen site positions shown in FIG. 9A(c) as the hydrogen atom positions gave better results. Hydrogen atoms at $H_i$ positions are a part of hydroxyl group (OH) and have a valence of +1. In addition, $H_{fcc}$ and $H_O$ have been reported to be hydride ion sites in similar perovskite type oxides (Reference 9), and the valence of the hydrogen atoms at the positions of $H_{fcc}$ and $H_O$ is −1.

The structural parameters and compositions determined by NRD Rietveld analysis are shown in Table 6 (Composition Example 3) and Table 7 (Composition Example 7). In NRD Rietveld analysis of Tables 6 and 7, "$D(D_O)$" represents a hydrogen atom (deuterium atom) at the oxygen site position, and "$D(D_{fcc})$" represents a hydrogen atom (deuterium atom) at the [100] face center position in the perovskite structure. The ratio of hydrogen atom in the compositional formula can be obtained by multiplying the sum of the respective occupancies of the lattice sites "D ($D_O$)" and "D ($D_{fcc}$)" by three. Furthermore, the ratio of oxygen atom in the compositional formula can be obtained by multiplying the occupancy of the lattice site "O(3e)" by three. The stoichiometric compositions are shown for the case where In is In(I) and In(III) (the general formula (1b)) and for the case where In is In(II) and In(III) or In(I) and In(II) (the general formula (1c) or (1d)), respectively.

TABLE 6

| Sample 13b (x = 0, y = 0.5) | | | Sample 23d (x = 0, y = 0.5) (after hydrogen introduction process with $D_2$) | | |
|---|---|---|---|---|---|
| Space group Pm-3m | Lattice constant a = 4.2020 | | Space group Pm-3m | Lattice constant a = 4.1989 | |
| Lattice Site | Position | Occupancy | Lattice Site | Position | Occupancy |
| Ba(1a) | (0.5, 0.5, 0.5) | 1 | Ba(1a) | (0.5, 0.5, 0.5) | 1 |
| Zr(1b) | (0, 0, 0) | 0.5 | Zr(1b) | (0, 0, 0) | 0.5 |
| In(1b) | (0, 0, 0) | 0.5 | In(1b) | (0, 0, 0) | 0.5 |
| O(3e) | (0.5, 0, 0) | 0.913 | O(3e) | (0.5, 0, 0) | 0.845 |
| | | | D($D_O$) | (0.5, 0, 0) | 0.0058 |
| | | | D($D_{fcc}$) | (0.5, 0.5, 0) | 0.049 |
| S = 8.28 | $R_{wp}$ = 13.8% | $R_p$ = 7.57% | S = 3.02 | $R_{wp}$ = 5.41% | $R_p$ = 3.73% |
| Composition according to Formula 5b | $BaZr_{0.5}In(III)_{0.5}O_{2.74}$ | | Average valence of In | | +2.44 |
| | | | Composition according to Formula 2b | $BaZr_{0.5}In(I)_{0.14}$ $In(III)_{0.36}O_{2.53}D_{0.16}$ | |
| | | | n/(w-0.5n) in Formula 2b | 1.1 | |
| | | | Composition according to Formula 2c | $BaZr_{0.5}In(II)_{0.28}$ $In(III)_{0.22}O_{2.53}D_{0.16}$ | |

TABLE 7

| Sample 17b (x = 0.2, y = 0.5) | | | Sample 27d (x = 0.2, y = 0.5) (after hydrogen introduction process with $D_2$) | | |
|---|---|---|---|---|---|
| Space group Pm-3m | Lattice constant a = 4.1970 | | Space group Pm-3m | Lattice constant a = 4.1971 | |
| Lattice Site | Position | Occupancy | Lattice Site | Position | Occupancy |
| Ba(1a) | (0.5, 0.5, 0.5) | 0.8 | Ba(1a) | (0.5, 0.5, 0.5) | 0.8 |
| Zr(1b) | (0, 0, 0) | 0.5 | Zr(1b) | (0, 0, 0) | 0.5 |
| In(1b) | (0, 0, 0) | 0.5 | In(1b) | (0, 0, 0) | 0.5 |
| O(3e) | (0.5, 0, 0) | 0.85 | O(3e) | (0.5, 0, 0) | 0.761 |
| | | | $D(D_O)$ | (0.5, 0, 0) | 0.031 |
| | | | $D(D_{fcc})$ | (0.5, 0.5, 0) | 0.039 |

S = 9.68　　$R_{wp}$ = 14.8%　　$R_p$ = 8.52%　　S = 3.38　　　　　　$R_{wp}$ = 5.74%　　$R_p$ = 3.95%

Composition according to Formula 5b　　$Ba_{0.8}Zr_{0.5}In(III)_{0.5}O_{2.55}$

Average valence of In　　+2.34

Composition according to Formula 2b　　$Ba_{0.8}Zr_{0.5}In(I)_{0.165}$ $In(II)_{0.335}O_{2.28}D_{0.21}$ n/(w-0.5n) in Formula 2b　　1.3

Composition according to Formula 2c　　$Ba_{0.8}Zr_{0.5}In(II)_{0.33}$ $In(III)_{0.17}O_{2.28}D_{0.21}$ As shown in Table 6, for Sample 23d, most of the deuterium was $D_{fcc}$, and the ratio of $D_O$ was very small. For Sample 27d (x=0.2 and y=0.5), the amount of $D_O$ was comparable to the amount of $D_{fcc}$. In both cases, there were no hydrogen atoms at $D_i$. Comparison of the results of Samples 23d and 27d showed that Ba loss in the hydrogen-containing BZI compounds increased the occupancy of $D_O$. This is consistent with the result of TG measurement (FIG. 4(*d*)), in which lattice oxygen loss increases with increasing Ba loss x. These results indicate that hydride ions are formed in the hydrogen-containing BZI compound and that few protons are present.

Based on NRD Rietveld analysis, the compositions of the samples before and after the hydrogen introduction process of Composition Example 3 were $BaZr_{0.5}In_{0.5}O_{2.74}$ (Sample 13b, before the hydrogen introduction process) and $BaZr_{0.5}In_{0.5}O_{2.53}D_{0.16}$ (Sample 23d, after the hydrogen introduction process), respectively. The latter compound $BaZr_{0.5}In_{0.5}O_{2.53}D_{0.16}$ corresponds to the compound represented by the general formula (2a) with x=0, y=0.5, w=0.22 and n=0.16. Considering the ratio of the hydride ion, the average valence of In in Sample 23d is +2.44. Therefore, it is found that the composition of Sample 23d, which is the hydrogen-containing BZI compound, is more specifically $BaZr_{0.5}In(I)_{0.14}In(III)_{0.36}O_{2.53}D_{0.16}$ when represented by the general formula (2b) and $BaZr_{0.5}In(II)_{0.28}In(III)_{0.22}O_{2.53}D_{0.16}$ when represented by the general formula (2c).

On the other hand, the compositions of the samples before and after the hydrogen introduction process of Composition Example 7 were $Ba_{0.8}Zr_{0.5}In_{0.5}O_{2.55}$ (Sample 17b, before the hydrogen introduction process) and $Ba_{0.8}Zr_{0.5}In_{0.5}O_{2.28}D_{0.21}$ (Sample 27d, after the hydrogen introduction process), respectively. The latter compound $Ba_{0.8}Zr_{0.5}In_{0.5}O_{2.28}D_{0.21}$ corresponds to the compound represented by the general formula (2a) with x=0.2, y=0.5, w=0.27 and n=0.21. Considering the ratio of the hydride ion, the average valence of In in Sample 27d is +2.34. Therefore, it is found that the composition of Sample 27d, which is the hydrogen-containing BZI compound, is more specifically $Ba_{0.8}Zr_{0.5}In(I)_{0.165}In(III)_{0.335}O_{2.28}D_{0.21}$ when represented by the general formula (2b) and $Ba_{0.8}Zr_{0.5}In(II)_{0.33}In(III)_{0.17}O_{2.28}D_{0.21}$ when represented by the general formula (2c).

As mentioned above, the oxygen nonstoichiometric compositions of Samples 13b, 23d, 17b and 27d are generally consistent with the oxygen compositions determined by TG (see Table 3).

These results indicate that the hydrogen introduction process of the BZI compounds results in the reduction of In and the introduction of H, resulting in the hydrogen-containing BZI compounds containing hydride ions (the compounds represented by the general formulas (2a) to (2d)). Furthermore, hydrogens are confirmed to be introduced into two crystalline-sites of $H_O$ and $H_{fcc}$ by the hydrogen introduction process of the BZI compounds.

2-4. ESR Measurement

Electron spin resonance (ESR) spectra was measured for the D-substituted sintered samples 23c, 23e, 27c and 27e prepared in 1-1 and 2-1 above. The measurement was performed using an electron spin resonance measurement system (manufactured by ESR04, KEYCOM Corporation). FIG. 9B shows ESR spectra of the samples. Solid lines are spectra measured at room temperature (298K) and broken lines are those at 77K.

In both samples, no ESR peak indicating the presence of isolated electrons appeared at 77 K, but a signal due to the isolated electrons appeared at 298 K. This result indicates that In(III) with $5p^0$ electron configuration and In(I) with $5p^2$ electron configuration, both of which are ions without spin magnetic moments, coexist at 77K. On the other hand, asymmetric ESR signals were observed at 298K, and therefore In(II) having a spin magnetic moment due to $5p^1$ electron configuration was confirmed to be generated. It seems that as the temperature increases, an averaging (delocalization) of the charge occurs between some or all of In(III) and In(I) according to the reaction formula G, resulting in a generation of In(II).

[Chemical formula 29]

$$In(III)+In(I)\rightarrow 2In(II) \tag{G}$$

Considering the above, it is believed that: In in the In-reduced and the hydrogen-containing BZI compounds is in the state of In(I) and In(III) at about 77 K, the charge averaging from this state tends to occur as the temperature increases, and it becomes the state of In(I) and In(II) or the state of In(II) and In(III) at room temperature (298K) or more through the state of In(I), In(II) and In(III). The temperature at which the states are switched depends on a possibility of adjacency of In ions in the perovskite lattice, in other words on the content of In in compounds. This is because the higher the content of In, isolated In ions are reduced, and charge averaging between adjacent In ions is more likely to occur. For example, if y=0.3 or more in the general formulas (1a) and (2a), since there are hardly In ions isolated in the compounds, the less one of In(I) and In(III) is relatively easily consumed in the generation of In(II), and In at room temperature (298K) is considered to be in the state of In(I) and In(II) or the state of In(II) and In(III).

The change between ESR peaks for Samples 23c and 23e was larger compared with ESR peaks for Samples 27c and 27e. This is consistent with high amount of In(II) having the spin magnetic moment in the compounds of Samples 23c and 23e.

Example 3

Figure 10:
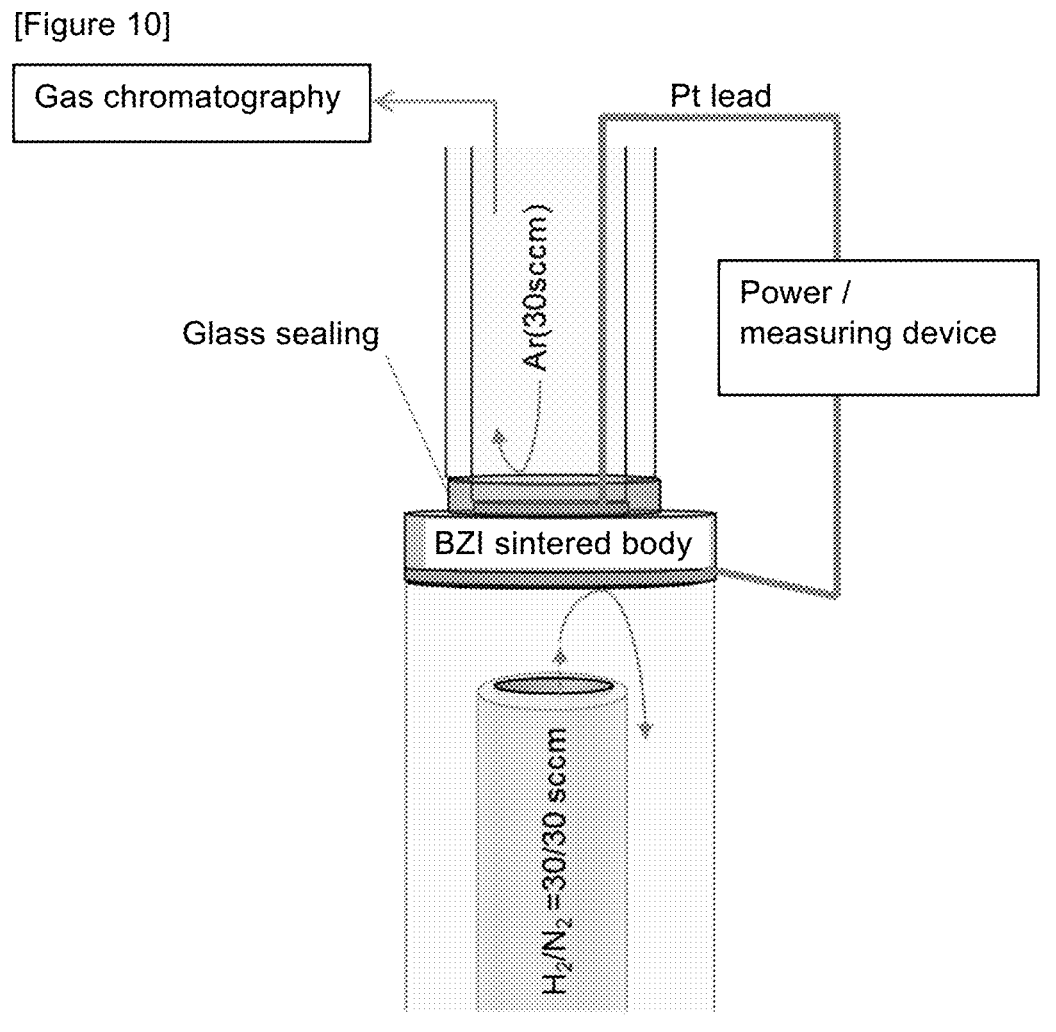

Hydrogen-Containing BZI Compound Sintered Body 3-1. Measurement of Hydrogen Permeability A hydrogen permeability of the hydrogen-containing BZI compound of Composition Example 7 was evaluated as one of physical properties. FIG. 10 is a conceptual diagram showing a measurement system for the hydrogen permeability. After polishing both surfaces of the as-prepared sintered sample 17a (diameter 10 mm and thickness 1.2 mm) according to 1-1 above with SiC paper, Pt pastes were baked on both surfaces to prepare electrodes. Alumina tubes were pressed against the electrodes on both sides with Pyrex (registered trademark) glass gaskets interposed therebetween, and a humidified or dry Ar was flowed on one side with 30 sccm, and a dried or humidified hydrogen gas (hydrogen:nitrogen flow rate ratio=1:1) was flowed on the other side. As described above, the sample was placed in the device, and the hydrogen permeation rate $J_{H2}$ $(mol \cdot s^{-1} cm^{-2})$ was measured when DC voltage of ±1.5 V or an open-circuit potential (OCV) was applied to both Pt electrodes while maintaining at a predetermined temperature. The permeation rate was determined by the following formula, using the hydrogen concentration $C_{H2}$ (vol %) in Ar flow-side determined by gas chromatography. In the formula below, $S_{disc}$ is an area of the sintered disc, $F_{Ar}$ is a flux of Ar gas (30 $cm^3 \cdot min^{-1}$), and $V_s$ is the standard volume of gas at 25° C. and 1 bar $(22.4 \times 10^3 cm^3)$.
[Mathematical formula 6]

$$J_{H2} = C_{H2} \times 10^{-2} \times F_{Ar} / (V_s \times 60 \times S_{disc})$$

Furthermore, the hydrogen permeation rate $J_{H2}$ of the sintered sample 27a (after the hydrogen introduction process) prepared according to 2-1 above was measured in the same manner.

FIG. 11 shows the hydrogen-permeation rates ($J_H$) of (a) Sample 17a and (b) Sample 27a at various temperatures. A hydrogen concentration cell {Pt(re), 50%-$H_2 \cdot N_2$||Ar, Pt(we) }, in which Samples 17a and 27a were used as a separation film, were prepared, and then the hydrogen permeation rate ($J_H$) was measured when the open-circuit voltage (OCV) →−1.5 V constant-voltage→+1.5 V constant-voltage was applied at intervals of 30 minutes or 40 minutes to the Pt(we) electrode at the lower hydrogen concentration side of the cell. In FIG. 11(a), the gases at both ends were humidified and contained the water vapor partial pressure of 0.023 atm. In FIG. 11(b), a dry gas was supplied.

In the measurement of Sample 17a, the humidified gas was used, and Sample 17a was changed to a hydrate of the BZI compound by hydration reaction, so hydrogen transport by proton conduction was performed. Sample 17a shows a relatively large open-circuit voltage, which is consistent with the fact that hydrates of BZI compounds have approximately a proton transport number of 1 (Reference 1). The hydrate of the BZI compound exhibited no hydrogen permeation at the open-circuit voltage. This indicates that the hydrate of the BZI compound does not exhibit electronic conductivity, so that hydrogen transport due to the concentration gradient, i.e., mixed conduction of $H^+$ and $e^-$, does not occur. This is consistent with the fact that the oxide has the proton transport number of 1 (References 1 and 2). On the other hand, application of −1.5 V DC voltage to the low hydrogen partial pressure side showed obvious hydrogen permeability. This is considered to be due to that the electric field pumped protons from the high hydrogen partial pressure side to the low oxygen partial pressure side. It has been also confirmed that no hydrogen permeability was observed when +1.5 V was applied to the other side of the observed JH, and no pumping occurred.

Sample 27a, which is the hydrogen-containing BZI compound, exhibited much higher hydrogen permeability than Sample 17a at temperatures of 400° C., 500° C. and 550° C., regardless of the lower temperature range compared to the case of Sample 17a. Sample 27a exhibited a small positive open-circuit voltage and an obvious hydrogen permeability at any temperatures. Therefore, it is indicated that Sample 27a performed by the hydrogen introduction process is a mixed conductor exhibiting hydride ion conduction and electronic conduction.

As expected from the conductivity measurements shown in FIG. 3, Sample 27a exhibited a higher DC current than the as-prepared sample. However, for Sample 27a, a current of several hundred mA was flowed when −1.5 V was applied, but no increase in transmission rate was observed when −1.5 V was applied, and the current increase was less than 5% when +1.5 V was applied. Therefore, it can be seen that Sample 27a subjected to the hydrogen introduction process has very high electronic conductivity, and the transport number of hydride ion is relatively low.

Although not shown in the figure, similar hydrogen permeation rate measurements were performed for Samples 13a and 23a. The hydrogen permeation rate of Sample 23a is inferior to that of Sample 27a, but improved compared to Sample 13a. Furthermore, Sample 23a exhibited a similar, but inferior, mixed conductivity to Sample 27a. In addition, although not shown in the figure, similar hydrogen permeation rate measurements were performed for Samples 16a and 26a. The hydrogen permeation rate of Sample 26a was comparable to that of Sample 27a and much improved compared to Sample 16a. Furthermore, Sample 26a exhibited the mixed conductivity comparable to that of Sample 27a.

Example 4

4-1. Fabrication of Thin Film Device

A thin film device (a composite member of the present invention) was fabricated by the following methods, the device including a cermet porous material body made of the BZI compound of Composition Example 3, 6 or 7 and Ni metal as a support and a BZI compound dense film of Composition Example 3, 6 or 7 (thickness of about 20 μm) laminated thereon. First, any one of the powder samples 13b, 16b and 17b prepared according to 1-1 above and a NiO powder were mixed at a ratio of 55:45 by weight, and the mixed powder was uniaxially molded and hydrostatic pressed to prepare a green disc (the cermet support) having a diameter 21 mm and a thickness 2 mm. Next, a paste was prepared by dispersing another one of samples 13b, 16b and 17b prepared according to 1-1 above (the same kind as that used in preparing the cermet support) in an alcohol, and the paste was spin-coated on the green disk and baked at 1400° C. for 6 hours. As a result, a BZI compound thin film was laminated on a surface of the composite ceramics consisting of NiO and the BZI compound. Finally, the green disk was heated at 700° C. for 15 hours in dry hydrogen gas ($H_2$:Ar flow ratio=1:9) and then cooled to room temperature at 2° C./min in the same atmosphere to introduce hydrogens into the above composite ceramics and BZI compound thin film, and reduced NiO in the green disk to Ni to make the green disk porous. The resulting thin film device for measurement comprised a cermet support and a hydrogen-containing BZI compound thin film (hereinafter referred to simply as hydrogen-containing BZI film) laminated on the support.

FIG. 12($a$) is a conceptual diagram of the thin film device 10 fabricated by the above-described method. The composite cermet 11 as the support was made of a composite ceramic containing a hydrogen-containing BZI compound 12 having the composition $Ba_{1-x}Zr_{0.5}In_{0.5}O_{2.75-x-l}H_n$ (x=0, 0.1, 0.2) and Ni 13. The thin film on the support is a thin film 14 made of a hydrogen-containing BZI compound having the composition $Ba_{1-x}Zr_{0.5}In_{0.5}O_{2.75-x-l}H_n$ (x=0, 0.1, 0.2).

4-2. SEM Images

FIG. 12($b$) to ($e$) are scanning electron microscope (SEM) pictures at a cross-section of the thin film device shown in FIG. 12($a$). In FIG. 12, (b) and (c) are surface images of the hydrogen-containing BZI film fabricated using sample 17b, and (d) and (e) are cross-sectional images of the thin film device fabricated using sample 17b. The respective hydrogen-containing BZI films were uniform films having a film thickness of about 20 μm. Moreover, no cracking or delamination occurred in respective hydrogen-containing BZI films, even when the cermet support became porous.

4-3. Measurement of Hydrogen Permeability of Thin Film Devices

FIG. 13 is a graph showing a relationship between temperature and hydrogen permeability in each of the thin film devices obtained in 4-1 above. In FIG. 13, the hydrogen permeability is shown in Arrhenius plot format. Hydrogen permeability measurements were performed by the same manner as that described with respect to FIG. 10. A humidified hydrogen gas (hydrogen:nitrogen flow ratio=1:1) was supplied to the support side, while a pure Ar gas was supplied to the hydrogen-containing BZI film side, and the hydrogen and nitrogen permeated from the support side were determined by gas chromatography. As a result, the hydrogen permeate gas was detected and the nitrogen permeate gas was hardly detected in any of the thin film devices. This indicates that selective hydrogen permeation occurs in the thin film devices. The thin film devices using Sample 17b (x=0.2) and Sample 16b (x=0.1) exhibited higher hydrogen permeability than the thin film devices using Sample 13b (x=0). Furthermore, in the case of the thin film devices using Samples 17b and 16b, the hydrogen permeability in the temperature range of 400 to 600° C. was comparable to that of PdAg alloys (FIG. 13). These results indicate that thin films of hydrogen-containing BZI compounds have remarkable hydrogen permeability.

Example 5

5-1. Fabrication of Fuel Cell

A fuel cell 20 comprising a thin film device based on the hydrogen-containing BZI compound of Composition Example 7 as a hydrogen permeable anode was fabricated. FIG. 14($a$) shows a conceptual diagram of the fuel cell 20 fabricated. Using the same steps as in 4-1 above, a thin film device was fabricated by using a composite cermet 21 consisting of the hydrogen-containing BZI compound of Composition Example 7 and Ni metal as a support, and laminating a dense film 22 (thickness of about 20 μm) of the hydrogen-containing BZI compound of Composition Example 7 thereon. A $BaZr_{0.1}Ce_{0.7}Y_{0.2}O_3$ (BZCY) electrolyte thin film 23 (thickness of 1 μm) was deposited on the surface of the dense film by a high frequency sputtering method. The sputtering deposition conditions are summarized in Table 8 below. In this case, the film formation was performed by co-sputtering using targets of $BaCe_{0.8}Y_{0.2}O_3$ and $Zr_{0.9}Y_{0.1}O_2$.

High frequency sputtering conditions of BZCY electrolyte thin film

TABLE 8

| | |
|---|---|
| Sputtering atmosphere | 0.2%-$O_2$/Ar<br>($O_2$: 0.1 sccm, Ar: 49.9 sccm) |
| Substrate temperature | 500° C. |
| Target-to-substrate distance | $BaCe_{0.8}Y_{0.2}O_3$: 70 mm<br>$Zr_{0.9}Y_{0.1}O_2$: 120 mm |
| Sputtering output | $BaCe_{0.8}Y_{0.2}O_3$: 70 W<br>$Zr_{0.9}Y_{0.1}O_2$: 30 W |
| Sputtering pressure | 2.0 Pa |
| Sputtering time | 7 h |
| Annealing temperature | 700° C. |
| Annealing atmosphere | $O_2$ ($p_{O2}$ = 1.6 Pa) |
| Annealing time | 1 h |

Then, $La_{0.6}Sr_{0.4}Co_{0.2}Fe_{0.8}O_3$ (LSCF) powder paste (manufactured by Fuel cell materials Co.), which is a common fuel cell cathode material, was screen printed on the BZCY electrolyte film 23 to form a porous cathode 24 (thickness of 30 μm) to obtain the fuel cell 20. The fabricated fuel cell was installed in a self-constructed fuel cell station, and power generation was tested while humidified air ($H_2$O/$O_2$/Ar=3/20/77) was supplied on the cathode side and pure hydrogen was supplied on the anode side at 50 sccm. The current-voltage curve and current-power curve of the fuel cell were measured using Solartron 1268/1270 electrochemical analyzer.

5-2. SEM Images

FIG. 14($b$) to ($d$) show the cross-sectional SEM pictures of the fuel cell. FIG. 14($c$) is an enlarged picture of the region R1 in FIG. 14($b$), and FIG. 14($d$) is an enlarged picture of the region R2 in FIG. 14($c$). Uniform BZCY electrolyte thin film was formed on the thin film device.

5-3. Output Characteristics of Fuel Cell

FIG. 15 shows an output characteristic (current-voltage-output curve) of the fuel cell. At 600° C., the open-circuit voltage was 1.05 V and the peak power output was 0.27 W/cm². In addition, the open-circuit voltage increased with decreasing temperature, reaching 1.13 V at 500° C. These results demonstrate that the hydrogen permeable material containing the hydrogen-containing BZI compound functions well as hydrogen permeable anodes in fuel cells and is stable in fuel cell environments.

REFERENCES

1. I. Ahmed, S.-G. Eriksson, E. Ahlberg, C. S. Knee, M. Karlsson, A. Matic, D. Engberg, L. Boerjesson, Solid State Ionics 177 (2006) 2357.
2. Istaq Ahmed, Christopher S. Kneeb, Maths Karlsson, S.-G. Eriksson, Paul F. Henry, Aleksandar Matic, Dennis Engberg, Lars Boerjesson, J. Alloys Compd 450 (2008) 103.

3. I. Ahmed, S.-G. Eriksson, E. Ahlberg, C. S. Knee, P. Berastegui, L.-G. Johansson, H. Rundloef, M. Karlsson, A. Matic, L. Boerjesson, D. Engberg, Solid State Ionics 177 (2006) 1395.
4. Istaq Ahmed, Francis G. Kinyanjui, Patrick Steegstra, Zhijian J. Shen, Sten-G. Eriksson, Mats Nygren, Electrochem. Solid-State Lett. 13 (2010) B130.
5. Wenping Sun, Zhiwen Zhu, Zhen Shi, Wei Liu, J. Power Sources 229 (2013)
6. A. Tsoukalou, P. M. Abdala, D. Stoian, X. Huang, M.-G. Willinger, A. Fedorov, C. R. Willer, J. Am. Chem. Soc. 141 (2019) 13497.
7. D. Joseph, A. K. Yadav, S. N. Jha, D. Bhattacharyya, Bull. Mater. Sci. 36 (2013) 1067.
8. B. D. Shrivastava, J. Phys.: Conf. Ser. 365 (2012) 012002.
9. N. Masuda, Y. Kobayashi, O. Hernandez, T. Bataille, S. Paofai, H. Suzuki, C. Ritter, N. Ichijo, Y. Noda, K. Takegoshi, C. Tassel, T. Yamamoto, H. Kageyama, J. Am. Chem. Soc. 137 (2015) 15315.
10. I. Oikawa and H. Takamura, Chem. Mater., 27, 6660 (2015)
11. Y. Kobayashi et al., Nature Mater., 11, 507 (2012)

INDUSTRIAL APPLICABILITY

The hydrogen permeable material of the present invention is useful as a material for fuel cells.

The invention claimed is:

1. A hydrogen permeable material comprising a perovskite type compound represented by the following general formula (1a):

[Chemical formula 1]

$$M_{1-x}Zr_{1-y}In_yO_{3-x-0.5y-w} \tag{1a}$$

in Formula (1a), M is at least one alkaline earth metal selected from the group consisting of Ba, Sr and Ca, x is a numerical value of 0 or more and 0.3 or less, y is a numerical value of more than 0 and 0.75 or less, w is a value at which an average valence of In is $+1.0$ or more and $+2.5$ or less, $y \geq w$.

2. The hydrogen permeable material according to claim 1, wherein In is In(I), or In(I) and In(II), or In(II) and In(III), or In(I) and In(III), or In(I), In(II) and In(III):

wherein In(I) is In with a valence of $+1$,

In(II) is In with a valence of $+2$,

In(III) is In with a valence of $+3$.

3. The hydrogen permeable material according to claim 2, wherein the perovskite type compound represented by the general formula (1a) is represented by the following general formula (1b):

[Chemical formula 2]

$$M_{1-x}Zr_{1-y}In(I)_wIn(III)_{y-w}O_{3-x-0.5y-w} \tag{1b}$$

4. The hydrogen permeable material according to claim 2, wherein the perovskite type compound represented by the general formula (1a) comprises In(II) and is represented by the following general formula (1c) or general formula (1d):

[Chemical formula 3]

$$M_{1-x}Zr_{1-y}In(II)_{2w}In(III)_{y-2w}O_{3-x-0.5y-w} \tag{1c}$$

in Formula (1c), $y > 2w$;

$$M_{1-x}Zr_{1-y}In(I)_{2w-y}In(II)_{2y-2w}O_{3-x-0.5y-w} \tag{1d}$$

in Formula (1d), $y \leq 2w$.

5. The hydrogen permeable material according to claim 1, wherein the average valence of In is an average valence determined based on a mass change in a thermal analysis of the perovskite type compound.

6. The hydrogen permeable material comprising the perovskite type compound containing hydrogen (hereinafter referred to as a hydrogen-containing perovskite type compound), which is the perovskite type compound represented by the general formula (1a) according to claim 1 containing hydride ion ($H^-$) and in which a molar ratio (n/w) of the content n of the hydride ion and w is 2 or less.

7. The hydrogen permeable material according to claim 6, wherein the hydrogen-containing perovskite type compound is represented by the following general formula (2a):

[Chemical formula 4]

$$M_{1-x}Zr_{1-y}In_yO_{3-x-0.5y-w}H_n \tag{2a}$$

in Formula (2a), M is at least one alkaline earth metal selected from the group consisting of Ba, Sr and Ca, H is a hydride ion, x is a numerical value of 0 or more and 0.3 or less, y is a numerical value of more than 0 and 0.75 or less, w is a value at which the average valence of In is more than $+1.0$ and $+3.0$ or less, $y \geq w$ and $n/w \leq 2$.

8. The hydrogen permeable material according to claim 7, wherein In is In(I), or In(I) and In(II), or In(II) and In(III), or In(I) and In(III), or In(I), In(II) and In(III):

wherein In(I) is In with a valence of $+1$,

In(II) is In with a valence of $+2$,

In(III) is In with a valence of $+3$.

9. The hydrogen permeable material according to claim 8, wherein the hydrogen-containing perovskite type compound represented by the general formula (2a) is represented by the following general formula (2b):

[Chemical formula 5]

$$M_{1-x}Zr_{1-y}In(I)_{w-0.5n}In(III)_{y-w+0.5n}O_{3-x-0.5y-w}H_n \tag{2b}.$$

10. The hydrogen permeable material according to claim 8, wherein the hydrogen-containing perovskite type compound represented by the general formula (2a) comprises In(II) and is represented by the following general formula (2c) or general formula (2d):

[Chemical formula 6]

$$M_{1-x}Zr_{1-y}In(II)_{2w-n}In(III)_{y-2w+n}O_{3-x-0.5y-w}H_n \tag{2c}$$

in Formula (2c), $y > 2w$;

$$M_{1-x}Zr_{1-y}In(I)_{2w-y-n}In(II)_{2y-2w+n}O_{3-x-0.5y-w}H_n \tag{2d}$$

in Formula (2d), $y \leq 2w$, $2w-y-n \geq 0$.

11. The hydrogen permeable material comprising a hydrate of the perovskite type compound according to claim 1.

12. The hydrogen permeable material comprising a hydrate of the hydrogen-containing perovskite type compound according to claim 6.

13. The hydrogen permeable material according to claim 1, wherein a part of Zr and In, which are B-site element in the perovskite type compounds represented by the general formula (1a), is substituted with at least one element selected from the group consisting of rare earth elements, Ni and Zn.

14. The hydrogen permeable material according to claim 6, wherein a part of Zr and In, which are B-site element in the hydrogen-containing perovskite type compounds, is substituted with at least one element selected from the group consisting of rare earth elements, Ni and Zn.

15. A composite member having a hydrogen permeable layer consisting of the hydrogen permeable material according to claim 1 on at least a portion of a surface of a porous substrate.

16. A composite member having a hydrogen permeable layer consisting of the hydrogen permeable material according to claim 6 on at least a portion of a surface of a porous substrate.

17. The composite member according to claim 16, wherein the porous substrate is a cermet substrate, and the ceramic component of the cermet substrate is the same as the hydrogen permeable material of the hydrogen permeable layer.

18. A fuel cell comprising an anode layer containing the hydrogen permeable material according to claim 1, an electrolyte layer, and a cathode layer, on at least a portion of a major surface of a porous substrate in this order.

19. A fuel cell comprising an anode layer containing the hydrogen permeable material according to claim 6, an electrolyte layer, and a cathode layer, on at least a portion of a major surface of a porous substrate in this order.

20. The fuel cell according to claim 19, wherein the electrolyte layer consists of $BaZr_xCe_{1-x-z}Y_zO_3$, wherein x=0.1 to 0.8, z=0.1 to 0.25, x+z≤1.0.

* * * * *